(12) United States Patent
Haidvogl

(10) Patent No.: US 8,950,136 B2
(45) Date of Patent: Feb. 10, 2015

(54) FOUNDATION SYSTEM FOR RECEIVING THE LOAD OF A HOUSING OR OF AT LEAST ONE HOUSING MODULE OF A SELF-SERVICE MACHINE

(75) Inventor: Franz Engelbert Haidvogl, Ehrendorf (AT)

(73) Assignee: KEBA AG, Linz (AT)

( * ) Notice: Subject to any disclaimer, the term of this patent is extended or adjusted under 35 U.S.C. 154(b) by 108 days.

(21) Appl. No.: 13/502,764

(22) PCT Filed: Oct. 20, 2010

(86) PCT No.: PCT/AT2010/000398
§ 371 (c)(1),
(2), (4) Date: May 17, 2012

(87) PCT Pub. No.: WO2011/047401
PCT Pub. Date: Apr. 28, 2011

(65) Prior Publication Data
US 2012/0228466 A1    Sep. 13, 2012

(30) Foreign Application Priority Data
Oct. 20, 2009   (AT) .............................. A 1644/2009

(51) Int. Cl.
*E02D 27/01*     (2006.01)
*E02D 27/44*     (2006.01)
(Continued)

(52) U.S. Cl.
CPC *G07F 9/00* (2013.01); *E02D 27/44* (2013.01); *G07F 9/10* (2013.01)
USPC ........................................................ 52/294

(58) Field of Classification Search
CPC ....... E02D 27/016; E02D 27/44; E02D 35/00; E04F 15/02464; E04F 15/02476; F16M 5/00; F16M 7/00; F16M 9/00; F16M 11/24

USPC .................. 52/126.5, 126.6, 126.7, 294, 295; 248/679, 678, 346.05, 346.06
See application file for complete search history.

(56) References Cited

U.S. PATENT DOCUMENTS 1,456,499 A * 5/1923 Fitz Gerald ...................... 52/295
1,765,664 A * 6/1930 Flath ............................ 52/223.5
(Continued)

FOREIGN PATENT DOCUMENTS

AT          410 109       2/2003
CN          2461159 Y    11/2001
(Continued)

OTHER PUBLICATIONS

International Search Report of PCT/AT2010/000398, date of mailing Jun. 24, 2011.
(Continued)

*Primary Examiner* — Christine T Cajilig
(74) *Attorney, Agent, or Firm* — Collard & Roe, P.C.

(57)    ABSTRACT

The invention relates to a foundation system (2) for receiving the load of a housing or at least one housing module (13, 13', 13") of a self-service machine (1), comprising at least one base element (14, 14', 14"), which has at least one support surface (16, 16', 16") for a housing or for at least one housing module (13, 13', 13") of a self-service machine (1). The base element (14, 14', 14") comprises a concrete body (17, 17', 17") and at least one metal carrier element (18, 18', 18") supported thereon, on which the least one support surface (16, 16', 16") for a housing or housing module (13, 13', 13") of a self-service machine (1) is formed, and the metal carrier element (18, 18', 18") can be leveled relative to the concrete body (17, 17', 17") of the base element (14, 14', 14") by means of at least one adjusting device (19).

35 Claims, 11 Drawing Sheets

(51) Int. Cl.
*G07F 9/00* (2006.01)
*G07F 9/10* (2006.01)

(56) References Cited

U.S. PATENT DOCUMENTS

| | | | | |
|---|---|---|---|---|
| 2,240,016 | A * | 4/1941 | Pinney | 52/296 |
| 2,819,037 | A * | 1/1958 | Wilkin | 254/104 |
| 2,971,295 | A * | 2/1961 | Reynolds | 52/223.7 |
| 3,087,206 | A * | 4/1963 | Delf et al. | 52/126.5 |
| 3,491,496 | A * | 1/1970 | Johnston | 52/65 |
| 3,511,001 | A * | 5/1970 | Morgan, Jr. | 52/126.5 |
| 3,722,845 | A * | 3/1973 | Unger | 248/346.03 |
| 3,800,636 | A * | 4/1974 | Zagar | 82/149 |
| 3,841,032 | A * | 10/1974 | Grannis, III | 336/65 |
| 4,578,910 | A * | 4/1986 | Germeroth et al. | 52/105 |
| 4,784,364 | A * | 11/1988 | Chamberlain et al. | 248/673 |
| 4,917,345 | A * | 4/1990 | Czech | 248/678 |
| 4,996,804 | A * | 3/1991 | Naka et al. | 52/126.6 |
| 5,016,338 | A * | 5/1991 | Rowan, Jr. | 29/423 |
| 5,630,303 | A * | 5/1997 | Devenish, III | 52/295 |
| 5,881,527 | A * | 3/1999 | Haseotes | 52/705 |
| 5,934,627 | A * | 8/1999 | Lewis et al. | 248/148 |
| 6,050,539 | A * | 4/2000 | Millen | 248/678 |
| 6,325,352 | B1 * | 12/2001 | Story | 248/678 |
| 6,772,564 | B2 * | 8/2004 | Leon | 52/126.5 |
| 2003/0033760 | A1 * | 2/2003 | Rogers et al. | 52/167.7 |
| 2005/0121593 | A1 * | 6/2005 | Acketts | 248/650 |
| 2011/0072738 | A1 * | 3/2011 | Hale | 52/126.6 |

FOREIGN PATENT DOCUMENTS

| | | |
|---|---|---|
| CN | 2517050 Y | 10/2002 |
| CN | 1419028 A | 5/2003 |
| DE | 24 34 813 A1 | 3/1975 |
| DE | 143 006 | 7/1980 |
| DE | 43 42 362 C1 | 1/1995 |
| DE | 44 27 653 | 2/1996 |
| DE | 100 07 932 | 6/2001 |
| DE | 202 16 236 | 2/2003 |
| EP | 0 737 346 | 7/1995 |
| ES | 2 344 394 | 8/2010 |
| GB | 1 462 186 A | 1/1977 |
| GB | 2 297 803 A | 8/1996 |
| JP | 57 140429 | 8/1982 |
| JP | 2007-170119 | 7/2007 |
| JP | 2008-223399 | 9/2008 |
| WO | WO 2005/028340 | 3/2005 |
| WO | WO 2008/105012 | 9/2008 |

OTHER PUBLICATIONS

Chinese Search Report in Chinese Application No. 201080053649.X, 2013.

* cited by examiner

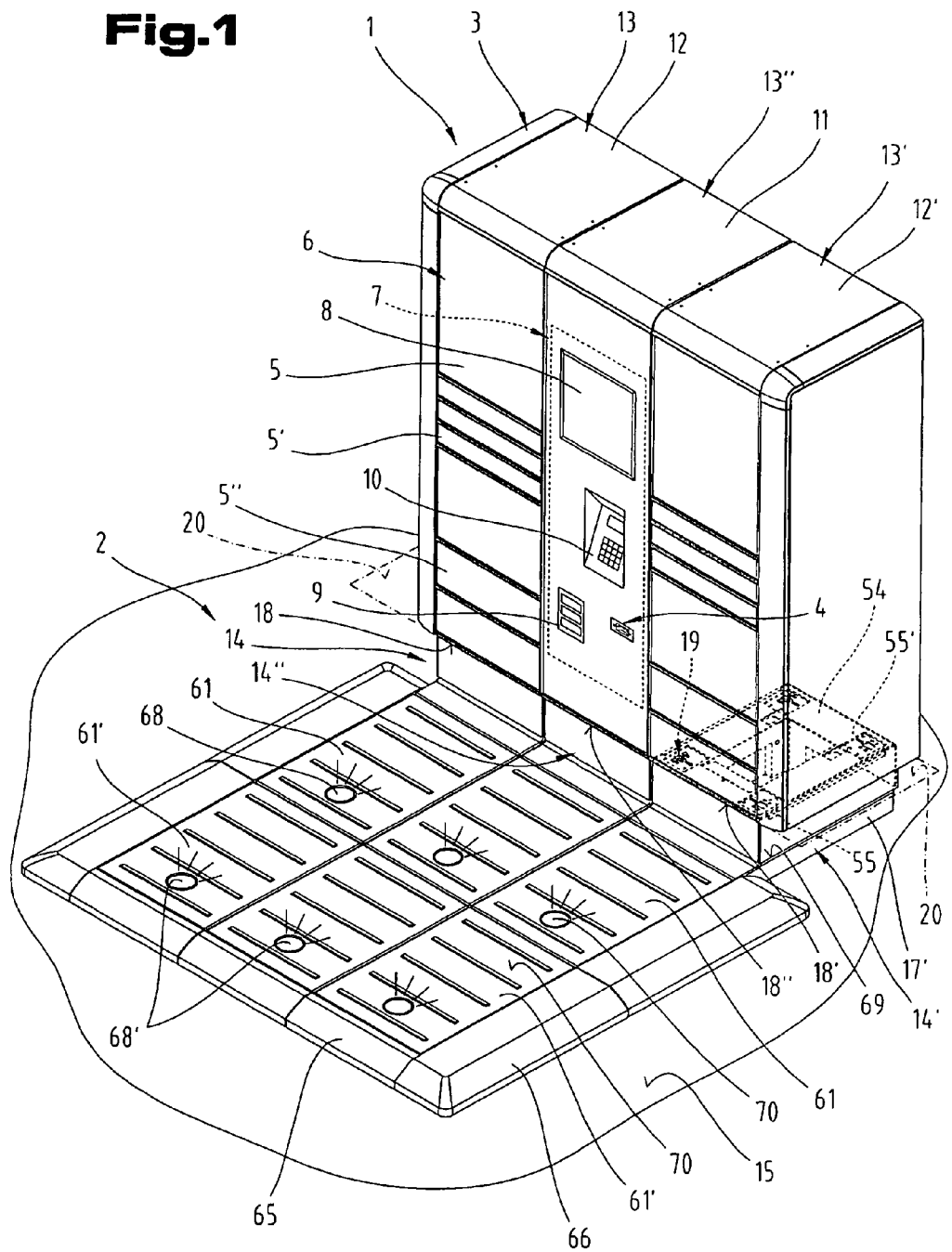

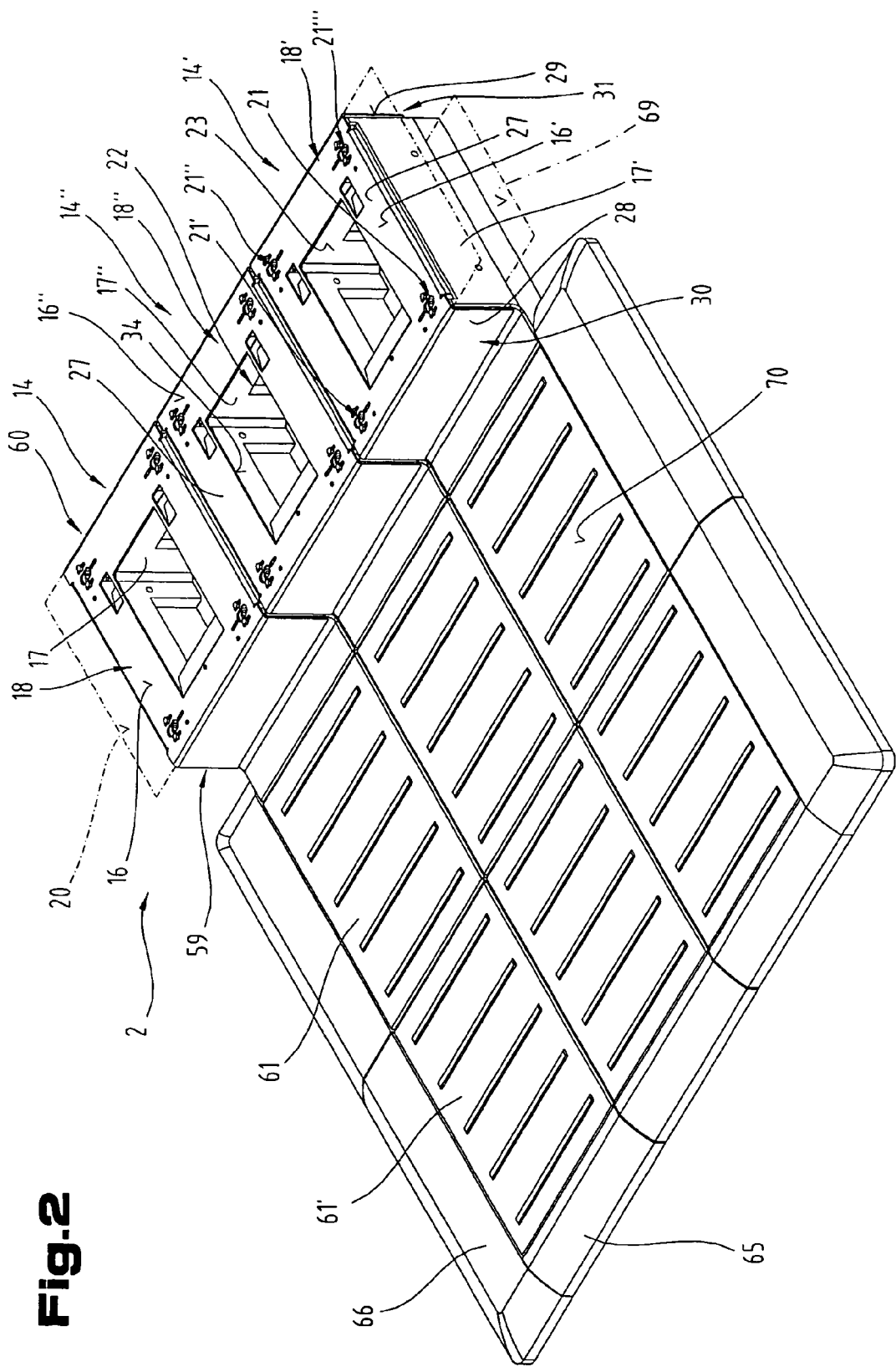

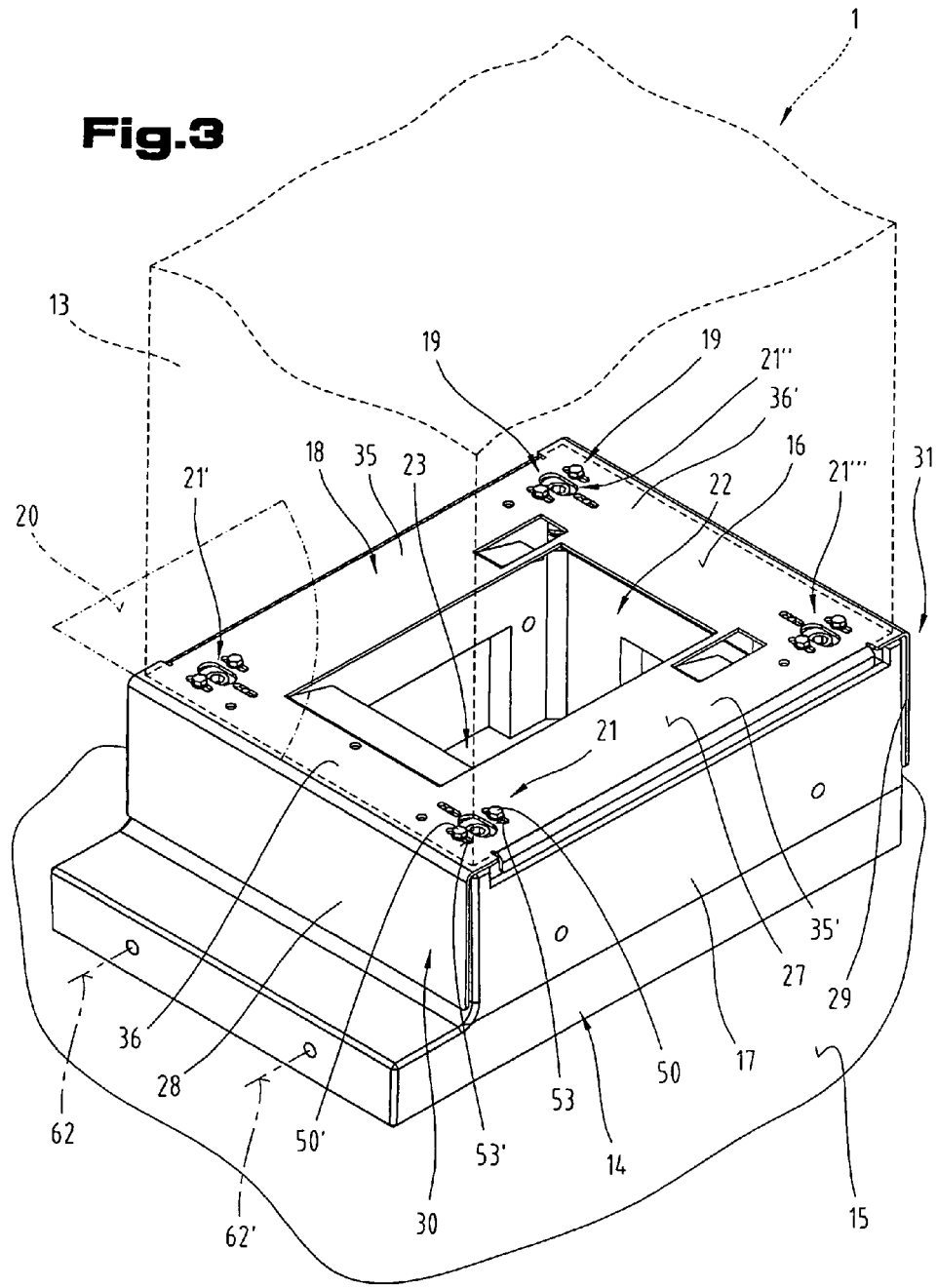

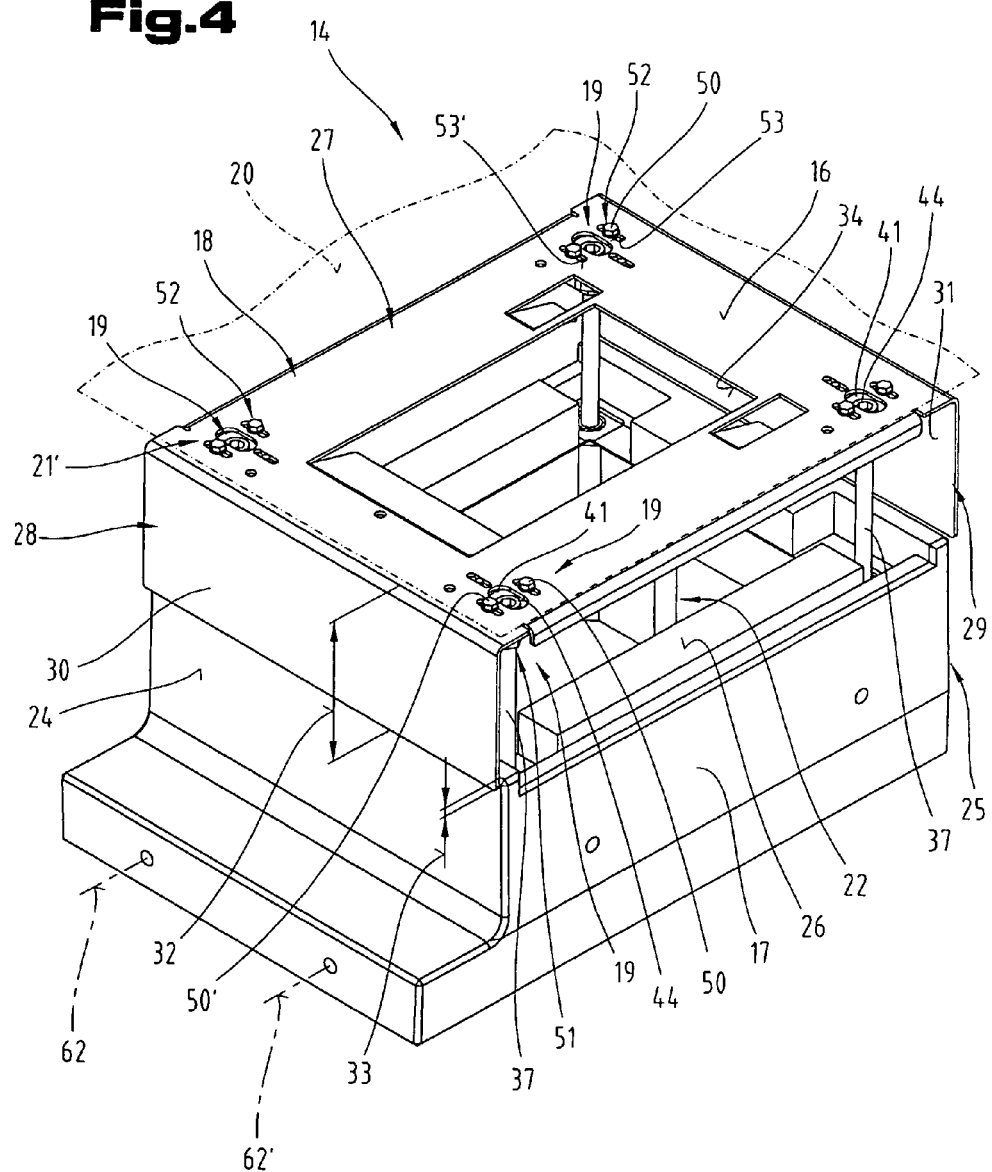

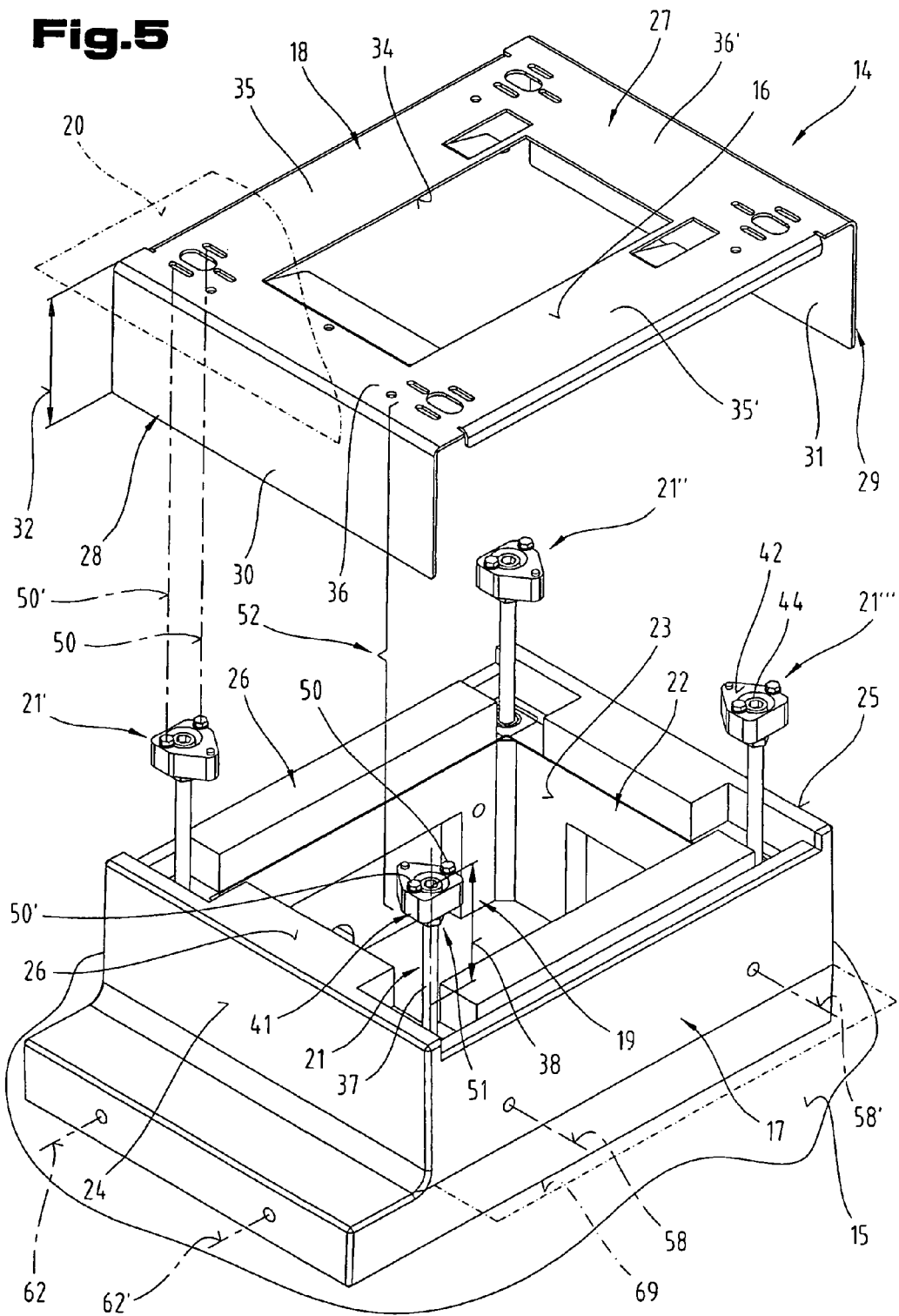

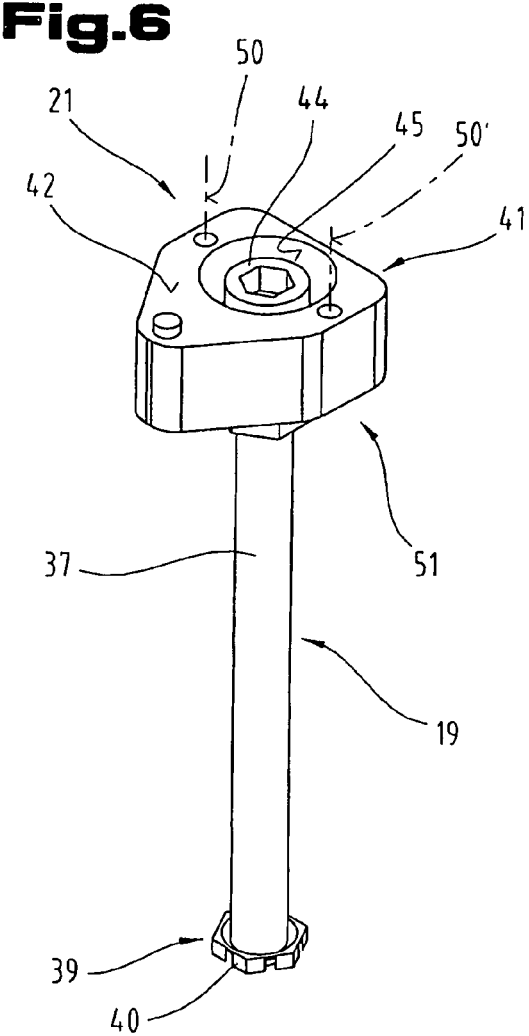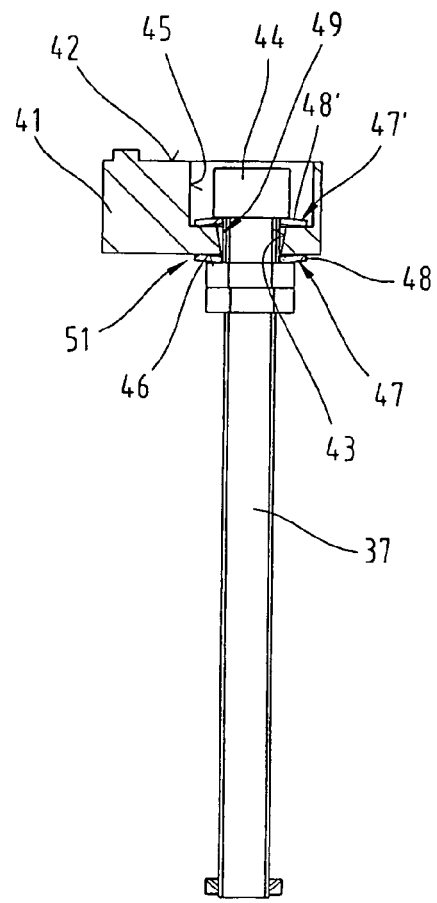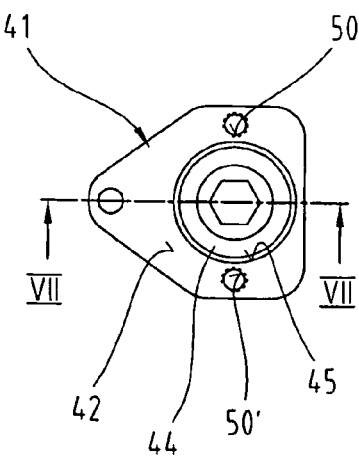

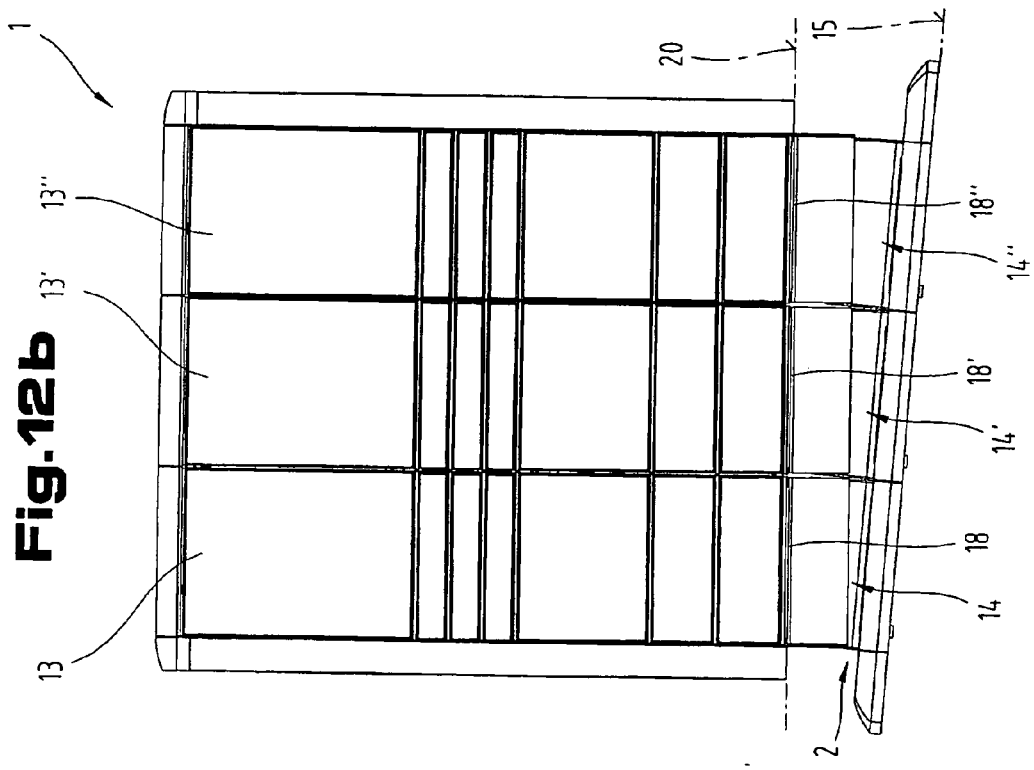
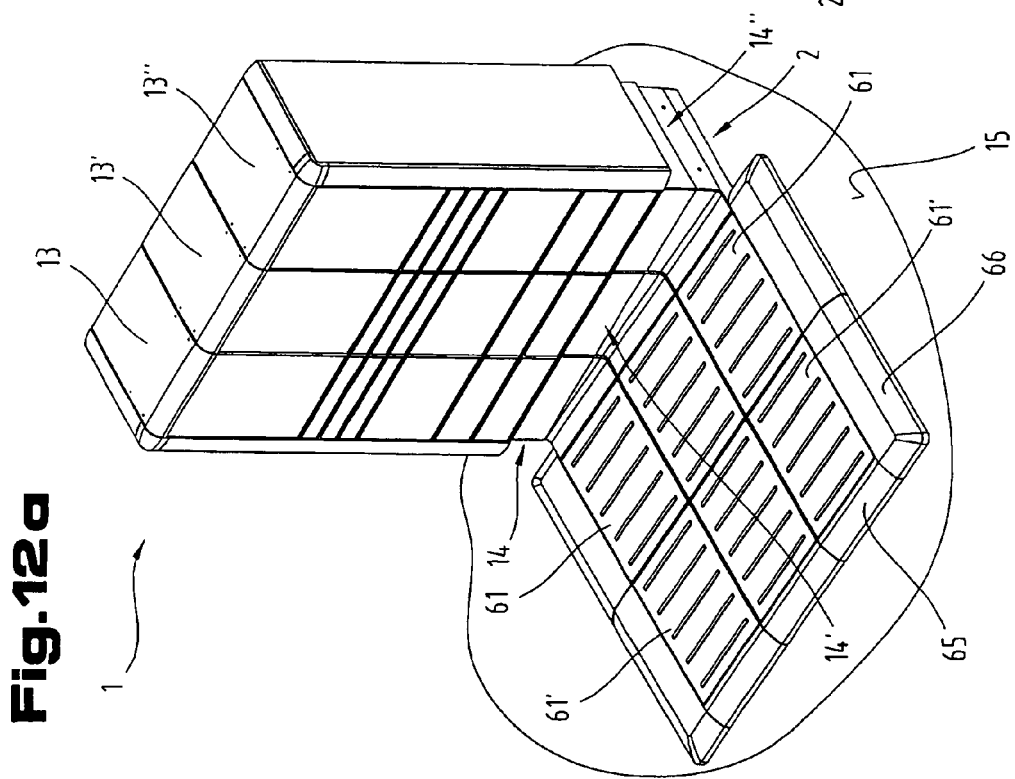

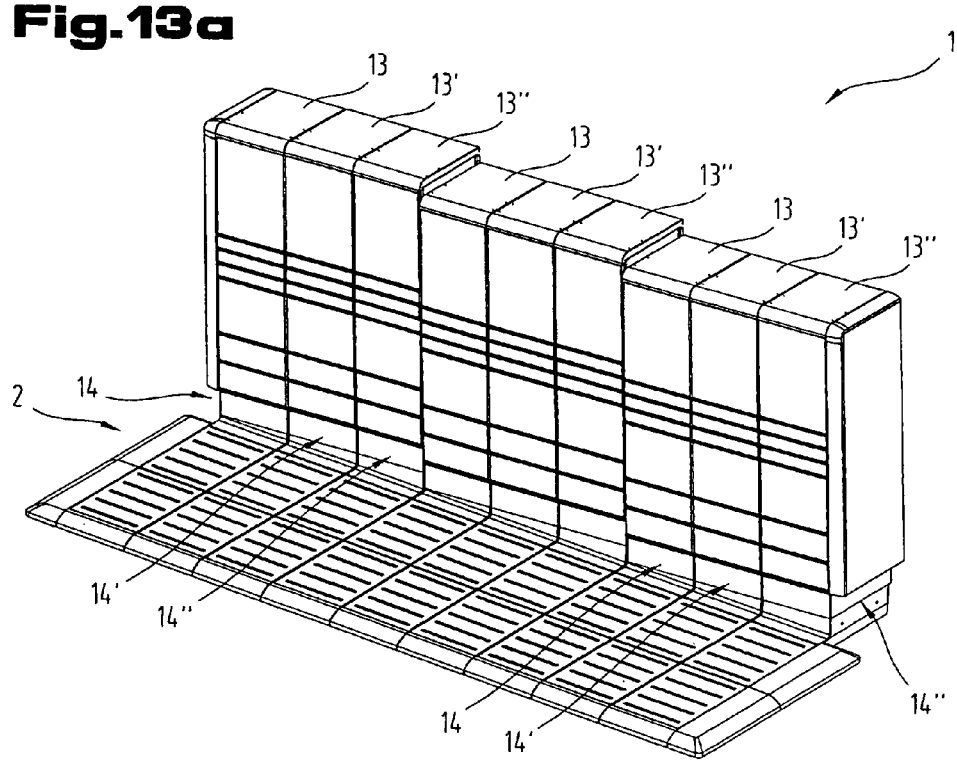
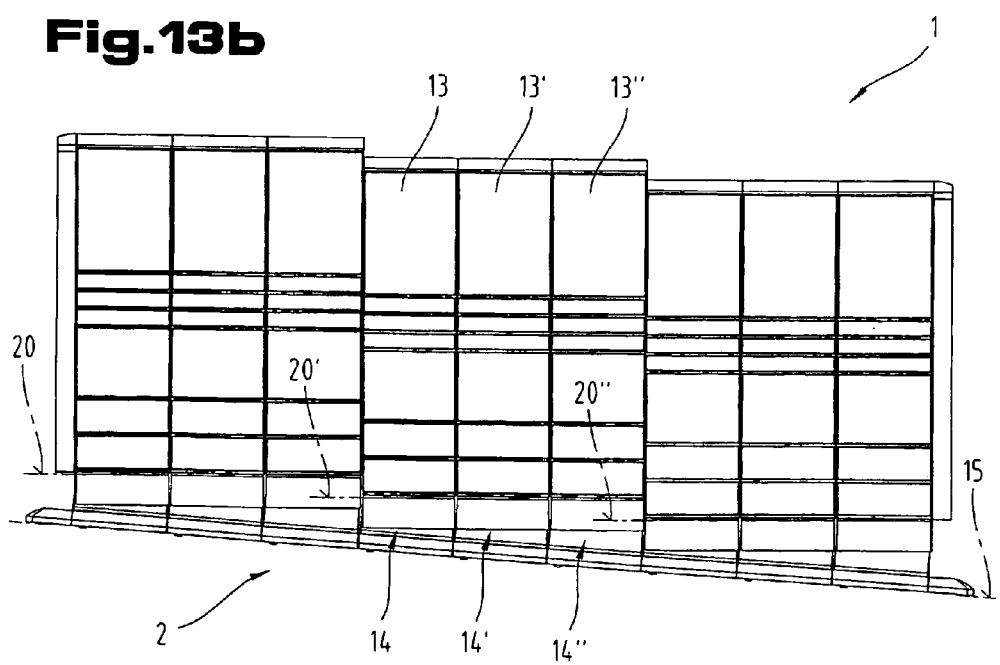

FOUNDATION SYSTEM FOR RECEIVING THE LOAD OF A HOUSING OR OF AT LEAST ONE HOUSING MODULE OF A SELF-SERVICE MACHINE

CROSS REFERENCE TO RELATED APPLICATIONS

This application is the National Stage of PCT/AT2010/000398 filed on Oct. 20, 2010 which claims priority under 35 U.S.C. §119 of Austrian Application No. A 1644/2009 filed on Oct. 20, 2009, the disclosure of which is incorporated by reference. The international application under PCT article 21(2) was not published in English.

The invention relates to a foundation system for receiving the load of a housing or housing module of a self-service machine.

In practice, self-service machines are usually erected on a base that is sufficiently flat or oriented horizontally as far as possible. It is primarily in indoor areas that floor spaces are available on which self-service machines can be erected with relatively few problems. In such cases, the machine housing may have a pedestal-type base element which sits directly on the respective floor covering. Machine housings are also known which have adjusting feet which can be screwed in and out relative to the machine housing as necessary in order to obtain a stable and as exact as possible vertical orientation of the machine housing if the building floor is inclined or in the case of other surfaces with a certain inclination or unevenness. Such adjusting feet are supported by means of support surfaces, which have a surface area at most the size of a hand which sits on the respective floor surface. In indoor situations where the floor usually has a sufficient load-bearing capacity, such adjusting feet have proved to be effective. Outdoors, however, such adjusting feet are only suitable under certain circumstances. Even then, however, when it comes to installing machine housings of relatively large volume outdoors, such adjusting feet soon reach their limits from numerous points of view. In the case of larger self-service machines, especially of the type based on storage compartment systems requiring relatively large-volume or large storage surfaces or safety deposit machines used for the receiving and collection of goods or postal items, such height-adjustable adjusting feet are only satisfactory to a certain degree. Another problem resides in the fact that the machines should not only stand vertically upright to a certain degree but must also be appropriately secured to prevent them from tipping over. Especially in the case of machines with a relatively short depth and high height, this is a major problem. Simple adjusting feet underneath the housing base surface are not well suited to this purpose and they need to be appropriately anchored in the ground underneath, for which purpose it is common practice to use screw-in anchors. This being the case, concrete foundations are cast into the ground in many cases, in order to provide a sufficiently flat and stable base for such compartment systems and storage machines. In this respect, in situations where the ground does not provide sufficiently strong support, the top layers of earth are removed and a foundation slab of concrete is constructed on site. An appropriate concrete shuttering is erected before introducing the concrete on site. Once the liquid concrete has been cast and sufficiently hardened, the concrete shuttering is then removed. Once the concrete has finally hardened and the concrete foundation slab has sufficient load bearing capacity, it is then possible to erect a corresponding self-service machine on it and anchor it to the concrete foundation integrated in the floor sub-structure. These foundation systems are complex and only satisfactory in certain situations. In particular, these concreting works carried out during the course of erecting a machine require appropriately experienced tradesmen as well as a lot of time-consuming work directly at the site where a machine is to be erected, as well as additional waiting time for the concrete to set, and only then is it possible to actually erect the machine. Furthermore, any subsequent modification to, extension of or removal of the foundation is not possible or is so but would involve a considerable amount of resources.

An approach known from WO 2005/028340 A1 and U.S. Pat. No. 5,881,527 A is to prepare the prefabricated slab foundation from concrete, comprising several slab elements placed one against the other. These slab elements are lifted by mechanical lifting means such as cranes for example, at the respective erection site. The individual slab elements are then connected by means of various connecting elements to form a one-piece foundation slab of concrete. The top face of this multi-part foundation slab is then joined to form a single-piece concrete body and is then ready to accommodate small buildings or similar storage objects. For example, tanks and additional equipment for storing and supply chemical substances can be erected and installed on it. However, these constructions are not suitable for erecting self-service machines, which are of a size ranging from box structures to small rooms.

DE 44 27 653 A1 describes a miniature bank for cash transactions, which miniature bank is anchored on an underground reinforced concrete foundation to prevent it from being torn out. This miniature bank for cash transactions comprises a strong room with an automatic teller machine, a safety cabinet with safety devices and a cabin. A miniature bank of this type is used as a so-called City Cash Point, which is intended to make the dispensing of cash much easier for bank customers. There are aspects of this miniature bank which relate to security in terms of criminal actions or manipulations with a view to theft. In order to address these requirements, it is proposed that the underground reinforced concrete foundation of the miniature bank should have a main foundation footing projecting out from the square-shaped main body, which is embedded in the ground. This reinforced concrete foundation can be supplied as a finished element and the foundation footing is formed on its foundation slab. Formed in this foundation slab is a hollow cylindrical foundation shuttering, provided as a means of receiving localized concrete filling in order to form a stable foundation block. Disposed on the top face of this reinforced concrete foundation is a base plate of reinforced concrete which is anchored to the reinforced concrete foundation disposed underneath. The safety cabinet and the cabin of the miniature bank are secured to this base plate. An angle iron frame may also be disposed on the top edge of the reinforced concrete foundation, for example screwed to it. A base frame with adjustable screws is inserted in this peripherally extending angle iron frame to accommodate the base plate and adapt to the ground level. Alternatively, the reinforced concrete foundation and its foundation block may have a peripherally extending holder recessed into the concrete body for the reinforced concrete base plate. Mutually connecting and anchoring the reinforced concrete foundation, the base plate seated on it and the elements of the miniature bank is intended to result in a foundation which satisfies the security requirements of a credit institution from a construction point of view. Although this design results in a foundation that is secure in terms of attempts at manipulation and is relatively well protected against criminal attempts to remove it, the fact that the reinforced concrete foundation has to be imbedded underground requires excavation work, which brings with it a great deal of effort and in particular requires special care, especially in city environments, as regards supply lines laid in the earth, in particular pipework, cables and such like.

DE 100 07 932 C1 describes a height-adjustable base for cash dispensers or similar devices with security issues. This base is provided in the form of a sheet metal construction and affords sufficient stability for the device seated on it due to an anchoring system comprising ground screws or ground anchors. In particular, a ground frame unit is provided, which can be secured on the ground by means of screws or other anchoring means. Disposed on this ground frame unit to be anchored to the ground is a support unit, which is telescopically adjustable in height relative to the ground frame unit. The height of the device supported on the base can be adjusted due to the fact that the ground frame unit and support unit can be telescopically adjusted relative to one another. Without a multiple anchoring of the ground frame unit to the underlying ground, this base element made from a metal frame construction imparts satisfactory stability to the device mounted on it, in particular a cash dispenser, but only under certain conditions.

DE 202 16 236 U1 also describes a base for cash dispensers, which base is made continuously from metal frame parts and sheet metal components. In particular, this base comprises a support plate, on which a corresponding machine is to be retained, and a plurality of supporting feet, which hold the support plate at the desired distance above a floor-mounted base frame. The supporting feet are designed so that they can be mounted on the base frame in different dispositions or orientations to enable the support plate to be positioned at different levels relative to the base frame. This base construction also has to be anchored in the floor in order to provide the most solid support possible for cabinet-type machines. To this end, a plurality of orifices or bores are provided in the base frame as a means of receiving floor screws and for securing the base frame to the floor.

JP 57 140429 A describes a concrete foundation, which is anchored in the ground or earth and projects relatively far above the ground level, and at least one upwardly projecting anchoring screw is provided on its top face. An iron plate is provided on the top face of this concrete foundation, which is provided as a means of supporting devices. In order to obtain a horizontal orientation of this iron plate, at least one adjusting means is provided between the bottom face of the iron plate and the top face of the concrete foundation, in particular and adjusting screw in conjunction with at least one nut. A horizontal orientation of the iron plate relative to the concrete foundation can be obtained by means of this adjusting means. The anchoring screw extending through the iron plate, which is anchored in the concrete foundation, prevents the iron plate from being lifted off the concrete foundation. Once the leveling operation has been completed, the gap between the iron plate and concrete foundation is filled with a non-compressible injected material, in particular with an injected mortar, so that the adjusting means is permanently encased in this injected material. Although this design results in a base that is stable and protected against manipulation, the concrete foundation also has to be cast in a hole in the ground in order to ensure sufficient stability and a low standing height. Another disadvantage resided in the fact that the adjusting means is embedded in the concrete after leveling and it is therefore no longer possible to make a subsequent adjustment or dismantle the system without causing damage.

The underlying objective of this invention is to propose an improved foundation system for receiving the load a housing or at least a housing module of a self-service machine. In particular, the intention is to propose a foundation system which enables a self-service machine to be erected in a short time, even if it is to be sited in an outdoor location and varying or uncertain ground conditions prevail under certain circumstances.

This objective is achieved by a foundation system according to the invention.

A major advantage of the design proposed by the invention resides in the fact that a self-service machine comprising at least a housing or several housing modules can be erected within a relatively short time. In particular, relatively short erection times can be achieved and in addition, a high installation accuracy and a high installation quality can be achieved. The base element comprising a concrete body also offers a high degree of stability and optimum stability under load for the respective self-service machine. In many situations, anchoring for the at least one base element comprising a concrete body in the respective ground underneath can be dispensed with. This therefore enables installation times to be further shortened and the risk of damage to any lines run in the ground underneath, such as power and telecommunication cables, water or gas pipes, is minimized or ruled out altogether. The concrete body thus forms a stable foundation element which can be rapidly installed and is also particularly insensitive to environmental influences such as gritting salt, moisture and damage by animals for example, in particular rodents. In particular, the at least one concrete body of the base element forming a base footing as it were, is relatively insensitive to acid conditions such as can occur in the presence of gritting salt or animal urine, for example, as a result of which the foundation system proposed by the invention for a self-service machine remains visually appealing for a relatively long time and largely requires no maintenance. In conjunction with the metal carrier element, which can be leveled relative to the concrete body, intrinsic tolerances or inaccuracies associated with the concrete body and its site of installation can be compensated in a simple and visually appealing manner, so that the at least one machine housing can be erected as correctly and accurately as possible. This adjustment can be made relatively quickly by means of the manually operated adjusting device and at the same time can be implemented with a high degree of accuracy and adequate quality. Accordingly, a certain amount of unevenness can be rapidly and easily compensated by the adjusting device for the carrier element, as a result of which an absolutely flat and horizontal support plane is obtained for the respective housing or housing module. The metal carrier element thus enables a simple and reliable connection to the housing or housing module, thereby also making it possible to meet safety requirements. On the one hand, the adjusting device for the carrier element enables sloping or uneven ground surfaces to be compensated. Secondly, the intrinsic dimensional tolerances of a concrete body are relegated to only minor importance because these can likewise be compensated by means of the adjusting device without any problem. Consequently, the cost of preparing the site and producing, assembling and erecting the foundation system proposed by the invention can be kept to a minimum.

A particular advantage gained as a result of the features proposed by the invention resides in the fact that the stability and stability under load of the foundation system can be further enhanced. Furthermore, a paved approach-way can be obtained, which protects the self-service machine against damage or dirt to a certain extent. This also results in a defined or virtually delimited approach area.

In particular, a virtually larger base footing is obtained which significantly increases the stability of the foundation system under load without the need for excavation work. This also enables installation to be undertaken on inclined spaces or road sections and an installation can be erected within reach of areas which can be driven on by vehicles. In particular, the hold between the individual paving elements and the at least one base element means that any relative shifting of the foundation system with respect to the ground underneath is made more difficult or kept to a minimum.

As a result of an embodiment, several base elements can be aligned with one another in a row, in particular with virtually no gaps, in a relatively compact arrangement, thereby enabling a foundation of a relatively large surface area overall to be obtained for a machine housing made up of a single piece or several modules. In particular, by aligning base elements or arranging them in a pattern of rows or columns, a foundation that is specifically adapted to the ground surface of the respective machine housing can be erected relatively quickly and one which offers a sufficiently high load-bearing capacity. In addition to its load-bearing function, the metal carrier element therefore also assumes the function of providing a facing for the concrete body, thereby ensuring an improved and appealing visual appearance and obviating the need for expensive surface treatment of the concrete body. Accordingly, this feature also enables the cost of producing the foundation system to be kept to a minimum, amongst other things.

Due to the features in accordance with another embodiment, a lightweight yet relatively dimensionally stable carrier element can be obtained, which is capable of withstanding high loads without being subjected to critical deformation. Furthermore, a carrier element of this type can be produced relatively inexpensively. Another advantage of this embodiment resides in the fact that, in addition to the supporting function, it also lends itself to a facing function. In particular, the concrete surfaces of the concrete base can be at least partially masked as a result, thereby offering an inexpensive way of meeting high aesthetic requirements as a result.

As a result of the features in accordance with another embodiment, the concrete body can be made to a relatively lightweight design, in spite of providing a relatively extensive base or mounting surface with as large as possible a surface area, which significantly improves stability. In particular, even in the case of a concrete body with a mounting surface of up to 1 m$^2$, a maximum total dimension can be achieved which enables the concrete body to be manipulated by only one fitter or at most two to four persons. Furthermore, the cavity can advantageously be used for running or accommodating line connections, in particular cable connections.

Also of particular advantage are the features in accordance with another embodiment because the time needed to erect self-service machines which have to be sited in outdoor locations can be drastically reduced. Very often, the task of erecting a self-service machine can even be completed in full within a few hours, which means that installation of the corresponding machine is now also suitable and economically viable for temporary applications. In particular, it is no longer necessary to factor in the time needed for the concrete to set. In addition, complex work processes on site are avoided. Furthermore, there is absolutely no need to coordinate a plurality of different professionals, who would otherwise be needed for earth works, shuttering work and concrete laying. The respective prefabricated concrete bodies can be positioned on the spot on site and the respective housing of the self-service machine can then be erected on them. Another advantage resides in the fact that the machine foundation can be easily and inexpensively removed in all situations. By contrast with concrete foundations which are anchored in the ground sub-structure or in the earth, the base elements proposed by the invention can be removed much more easily and used on another site if necessary. The time during which building site areas might have to be cordoned off in areas of public places, for example in pedestrianized areas or in the region of public buildings, can also be minimized by using the prefabricated concrete bodies for the base elements. It is also possible to extend a machine subsequently or undertake a change of position of a machine with relatively little effort.

Also of particular advantage is a feature in accordance with another embodiment because it enables exclusively manual handling, in particular transport by hand. The concrete body can expediently be lifted and carried by at least one fitter, preferably by two to four persons. Using simple aids, for example a pallet carrier or wheelbarrow, therefore, it is possible to work at sites off the beaten track that would not be accessible to vehicles. Also as a result of these features, it also possible to negotiate steps relatively easily. Ultimately, it is possible to reach sites which would not be accessible to vehicles or cranes or would be so but only with a very high degree of preparation and associated cost. Also of advantage is the fact that the respective installation and assembly can be carried out irrespective of the time of day and also regardless of the scheduling of transport or crane companies.

Also of advantage is another embodiment because it offers rapid and ultimately the cheapest possible method of leveling the standing or support surface for the self-service machine. By providing at least three but usually four adjusting elements disposed in a distributed arrangement, the support height of which can be adjusted as required, even relatively pronounced inclinations or skew positioning of the concrete body can be optimally compensated.

An adjusting element that is particularly reliable, robust and easy to use is defined in another embodiment. An adjusting element of this type also offers a high degree of safety during operation because it obviates the need for additional safety measures, especially if a threaded bolt based on a design retained by friction or a threaded bolt with a sufficiently small pitch is used. In particular, it is not possible for the adjusting element to be inadvertently moved, even in the event of carelessness on the part of the fitter or maintenance personnel.

Also of advantage is a feature in accordance with another embodiment because the portion of the threaded bolt which is available as an adjustment range is adjusted relative to the concrete body so that no gap or space to move the threaded bolt needs to be provided inside the machine housing. In particular, by changing the screw-in depth of the of the threaded bolt relative to the concrete body, the positioning or support height of the threaded bolt or adjusting element can be varied relative to the ground underneath within a relatively broad adjustment range if necessary.

Also of advantage is another embodiment because it affords support for the carrier element over a relatively large surface area and, even in the case where the concrete bodies are erected at an oblique angle, it affords a defined support for the carrier element relative to the concrete body, in particular relative to the threaded bolts.

The advantage of another embodiment is that a stable and defined support is provided for the carrier element relative to the at least one threaded bolt. Furthermore, the respective angle of rotation needed for the threaded bolts can be set steplessly in such a way that a horizontal orientation of the support head is obtained with respect to a threaded bolt that is inclined or skew in each of these positions of angular rotation.

A particularly robust and at the same time particularly inexpensive deign for an articulated connection between the threaded bolt and support head is obtained in accordance with another embodiment.

Another embodiment results in a robust spring element which remains functionally strong for a long period. It also enables defined spring and rebounding forces to be generated even in the case of relatively small construction volumes. These spring elements are also relatively rigid or inflexible in the longitudinal direction towards the threaded bolt so that undesired or load-induced vertical displacements of the support surface are kept to a minimum.

Also of advantage is a feature in accordance with another embodiment because the formation of gaps between the top edge of the concrete base and the bottom edge of the facing element are avoided. Firstly, an advantageous optical appearance is guaranteed and any accumulation of rubbish or other objects inside the base element is avoided. Secondly, it affords protection against nesting by rodents or other animals. Another advantage resides in the fact that the facing of the concrete body is automatically adapted to the respective settings, obviating the need for manual processing or subsequent cutting of the facing element. In particular, the facing element is automatically adjusted to the base or support level relative to the top edge of the concrete body when the adjusting work is being carried out so that there is no need for any finishing work to be carried out on the front face or rear face facing element of the base element.

In a particularly advantageous embodiment of a foundation system, the corresponding type of machine is expediently based on a modular design. The foundation system proposed by the invention can advantageously be retrofitted on or added to a storage machine system of this modular type without any problem, in particular offering a simple means of creating an extension and optionally also reducing its size or dismantling it.

As a result of the features in accordance with another embodiment, in particular due to the identical design of the base elements, work can be undertaken on the foundation system at any time to extend it or reduce it in size. In particular, no separate end or terminal elements are provided, which means that the foundation system can be extended from one or both end portions if necessary without any difficulty and can optionally also be reduced in size.

Also of advantage are the features in accordance with another embodiment because even in a situation where there are adjacent base elements positioned on differently inclined planes, a gap-free alignment can be obtained by reference to the transition portion. For example, even if a first base element is oriented on one level or horizontally and a base element adjoining it is oriented at an angle, it is possible to obtain an alignment as far as possible with no gap on a level with a first horizontal plane of the base element, which horizontal plane preferably at least approximately coincides with the level of the surface which can be walked on or the stepping surface of a walk-on approach area. In particular, adjacent base elements or their concrete bodies can be mutually supported in a defined manner, thereby resulting in improved stability, in particular a high degree of reliability that the foundation system will not wobble. This is primarily assisted by the fact that adjacent base elements, in particular their concrete bodies, can be slightly biased towards one another by appropriate clamping means, preferably by means of connecting screws.

Also of advantage are the features in accordance with another embodiment because a corresponding housing module can be accommodated in a reliable and stable manner. Furthermore, assembly of the housing module one the plate-shaped carrier element is made significantly easier.

The advantage of another embodiment is that the carrier element can be constructed to an extremely lightweight design but it still affords the support surfaces in those areas in which a strong supporting action is needed for the co-operating housing module. Another essential function is the fact that a generous access is provided to the base portion of a self-service machine, enabling cabling to be effortlessly run between a control module and at least one compartment module of a storage machine whilst at the same time offering effective protection. The power supply or control connection system for example can then be run via orifices in the side walls of the concrete bodies between adjacent modules of a self-service machine. Furthermore, a telephone or network connection can be accommodated in this base portion relatively quickly and easily if necessary and it will be particularly reliably protected from unauthorized access without the need to provide additional components.

Also of particular advantage are the features in accordance with another embodiment because a joined body is obtained which affords a high degree of stability. In particular, due to the fact that the individual concrete bodies are coupled so as to move in unison, an extremely strong cohesive mass can be obtained which significantly increases stability for the self-service machine. This also enables more stringent safety requirements to be met and usually obviates the need to anchor the concrete body in the ground underneath. In particular, sufficiently high stability can be achieved even against high wind loads or also in the event of increased pressing forces against the wall portions of the self-service machine. This also rules out the risk of damage to cables run underground because there is no need to provide a foundation or anchoring lying deep down or in the ground sub-structure.

Also of advantage are the features in accordance with another embodiment because the housing or compartment modules can be aligned in a row independently of one another. In particular, any adjustment which might have to be undertaken with regard to the vertical alignment or geometric dimensions of the housing modules, in particular to ensure that the individual housing module is sitting at a right angle, will not affect an adjacent housing module. In particular, force is transmitted directly or forcibly from one compartment module to an adjacent compartment module and thus prevents any possible strain or distortion of the module housing. Adjustment times are reduced as a result and housing modules, in particular compartment modules, can also be assembled exactly and to the intended geometry.

Also of advantage are the features in accordance with another embodiment because a cable or rod connection can be easily adapted to the respective length or width of the paving and base foundation required.

Also of advantage is another embodiment because it makes assembly of the foundation system easier due to relatively short part-portions. In particular, by lengthening or shortening the cable or rod connection as necessary, the respective tensioning or connection length desired can be obtained without having to work with awkward rod elements which require a large amount of space.

The features in accordance with another embodiment result in better cohesiveness between the respective paving elements aligned in a row with one another.

Also of advantage is another embodiment because it offers an easy way of providing an approach ramp to facilitate driving or walking on the paved elements. Furthermore, the plate connections are covered as a result, making them inaccessible or difficult to access for potential acts of vandalism.

Also of advantage is another embodiment because even in the event of relatively uneven or undulating ground contours, the individual paving elements can be aligned virtually without gaps.

Also of particular advantage are the features in accordance with another embodiment because regardless of how solid the ground underneath is, a high stability under load can be obtained for the self-service machine. The shortest possible erection times can also be achieved as a result.

An embodiment is also of advantage. Since the approach area to the self-service machine is made from concrete slabs and constitutes a fixed element of the machine, suitable lamp units can be integrated in the concrete slabs already with only minimal effort in terms of installation in order to illuminate the machine and its compartments. Such floor-mounted lamp units provide good illumination and at least in some cases this feature obviates the need for a complex front roof construction with lighting elements, thereby further reducing the overall costs incurred. The floor-mounted lamp units may be used as an additional design element.

The features in accordance with another embodiment are also of advantage because they enable a connection to be established easily and quickly between adjacent base elements and provide a generous and stable installation duct for cable connections.

Also of advantage is another embodiment because the possibility of a housing module accidentally falling off the foundation system can be ruled out.

An embodiment is also of advantage because even in the event of varying terrain or undulating or extensively uneven ground underneath or in the case of tolerances in the placement of the base elements, an extremely uniform or constant gap dimension can be obtained between mutually aligned carrier elements and hence also between mutually aligned housing modules. This results in a high assembly quality and a high precision of the installation.

Finally, an embodiment is of advantage because when the housing module has been assembled on the respective base element, a new adjustment or readjustment of the housing module can be undertaken at any time. This embodiment is especially practical in terms of providing compensation for potential sinking of individual base elements due to settlement of the ground underneath in all situations. Above all, maintenance and service work are made easier because there is no need to dismantle the housing module.

To provide a clearer understanding of the invention, it will be described in more detail below with reference to the appended drawings.

The drawings are highly schematic, simplified diagrams illustrating the following:

FIG. 1 a perspective diagram illustrating an example of an embodiments of a self-service machine, which is supported on a foundation system proposed by the invention;

FIG. 2 shows the foundation system illustrated in FIG. 1 without the self-service machine;

FIG. 3 shows an adjustable base element of the foundation system in its maximum lowered position;

FIG. 4 shows the base element illustrated in FIG. 3 in its maximum raised position;

FIG. 5 shows the base element illustrated in FIG. 4 in a partially exposed state, in particular in a state in which the carrier element has been removed from the concrete body;

FIGS. 6-8 show different views of an adjusting element of the base element;

Figure 9:
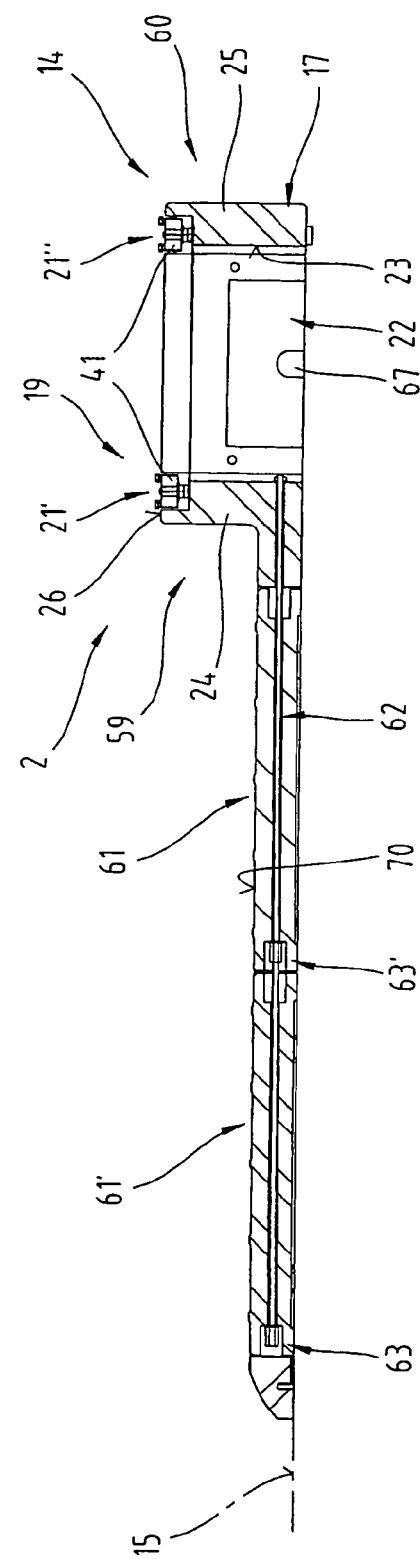
FIG. 9 is a vertical section illustrating a foundation system comprising at least one base element and at least two paving elements.

FIG. 12*a,b* show a self-service machine together with the foundation system proposed by the invention on steeply angled underlying ground;

FIG. 13*a, b* show a multiple alignment of housing modules of a self-service machine together with the foundation system proposed by the invention on steeply angled underlying ground.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates an example of a self-service machine 1 together with a foundation system 2 based on the design proposed by the invention. This self-service machine 1 illustrated by way of example is provided as a safety-deposit machine 3 for temporarily depositing a plurality of goods or objects, which can be collected round the clock by the designated addressee respectively. This safety-deposit machine 3 is comparable with a locker system but by contrast with a conventional locker system has at least one identification device 4 for identifying or checking the entitlement of a sender and/or a recipient of goods or objects. The identification device 4 may be provided in the form of a reading device for magnetic or chip cards, for transponders, for biometric identification features and/or other means fulfilling the corresponding control or checking function. The identification device 4 ensures that only an authorized person, in particular an authorized sender or collector of goods or objects obtains access to a selected or specific holding compartment 5, 5', 5" of a compartment system 6 of the self-service machine 1. The identification device 4 should therefore also be understood or regarded as meaning a means for checking entitlement, in which case an identification in the actual sense is not absolutely necessary.

The individual holding compartments 5, 5', 5" of the compartment system 6, preferably aligned in rows and columns, can be selectively unlocked by electronically activated doors in order to obtain access to a specific, closed compartment. This access controller or access control system is operated from a control device 7 which is at least partially implemented in the safety-deposit machine 3. The control device 7 may also be designed as a part-component of a distributed or decentralized control system. In order to run the respective procedures necessary and interact with a user, the safety-deposit machine 3 also has at least one input and/or output device 8, for example a touch-screen. Such a safety-deposit machine 3 may also have an identification means 9 for goods or objects, for example in the form of a barcode scanner or a transponder-reading device. Based on one advantageous variant, a payment module 10 is also provided, which enables a preferably cashless payment of fees for goods and/or services. Depending on the range of functions required and the application in question, the safety-deposit machine 3 or self-service machine 1 may have fewer and/or other components, which implement the respective technical functions required.

Instead of the safety-deposit machine 3 illustrated by way of example, the self-service machine 1 may also be a bank automated teller machine or an automatic vending machine. The respective self-service machine 1 is preferably installed on publicly accessible sites and can be used by either a theoretically unlimited circle of people or a limited circle of people registered to use it.

Especially in the case of a self-service machine 1 in the form of a bank automated teller machine, such a machine usually has a relatively rigid and intrinsically closed housing comprising a single part or several individual parts. The respective technical components and storage spaces needed are accommodated in this one-piece housing as well as any operating means or goods or payment means which might be necessary.

Based on one advantageous variant, the self-service machine 1 is of a modular design or can be assembled in a modular fashion, in particular can be extended if necessary and optionally also be reduced in size or have modules removed. In the case of one practical modular design of the self-service machine 1, in particular a safety-deposit machine 3, a controller housing 11 is provided in which the primary electrical and electronic components of the self-service machine 1 are accommodated, such as for example the control device 7, in particular a control computer, the input and/or output device 8, in particular a touch-screen, and optionally an identification device 4. This modular controller housing 11 can be combined with at least one other housing module 13, 13', 13", for example at least one compartment module 12, 12' comprising a plurality of holding compartments 5, 5', 5". For example, the essentially separate controller housing 11 can be inserted or aligned in a modular arrangement between two compartment modules 12, 12', each of which comprises a plurality of holding compartments 5 to 5". Naturally, it would also be possible to provide only one compartment module 12 or alternatively more than two compartment modules 12, 12'. The controller housings 11 may be positioned anywhere inside the respective number and layout of compartment modules 12, 12'.

Depending on the machine type, the self-service machine 1 may comprise housing modules 13, 13', 13" of a different type rather than at least one compartment module 12, 12'. For example, the self-service machine 1 may comprise at least one housing module 13, 13' for depositing payment means or bank notes to be dispensed or assigned as well as a housing module 13" aligned with it, in which the control-related components are integrated, in particular the control device 7 and the input and/or output device 8. Based on one advantageous embodiment, the housing modules 13, 13', 13" to be assembled to make up an overall system, in particular aligned with one another leaving no gaps, are each of the same or approximately the same volume regardless of their technical function. In particular, a base or cross-sectional surface of the individual housing modules 13-13" is preferably of the same or approximately the same dimensions. This means that the base surfaces and depth and width dimensions of the individual housing modules 13, 13', 13" are respectively the same or approximately the same.

As may best be seen by comparing FIGS. 1 and 2, the respective machine housing or at least one housing module 13, 13', 13" of a modular self-service machine 1 is supported so that load is transmitted via at least one base element 14, 14', 14" to the respective floor area or underlying ground 15. Especially in the case of a modular structure, in particular a self-service machine 1 which can be extended by adding modules, a base element 14, 14', 14" is provided respectively for each housing module 13, 13', 13" needed, as schematically illustrated in FIG. 1. This means that for every housing module 13, 13', 13", a respective cooperating base element 14, 14', 14" is disposed accordingly.

For each base element 14, 14', 14", at least one support plane or support surface 16, 16', 16" for a machine housing or for at least one housing module 13, 13', 13" of the self-service machine 1 is provided respectively. This support surface 16, 16', 16" is essentially solid, constituting a sort of platform relative to the underlying ground 15, and is approximately level or flat. At least some portions of this support surface 16, 16', 16" support the respective housing or housing module 13, 13', 13" so that the respective housing or respective housing module 13, 13', 13" of the self-service machine 1 stand as far as possible in a vertical orientation. In particular, the support surface 16, 16', 16" is designed to receive the load of the bottom face or base portion of a housing or housing module 13, 13', 13". The at least one support surface 16, 16', 16" on the top face of the respective base element 14, 14', 14" ensures that the self-service machine 1 is correctly oriented, in particular stands as far as possible vertically, and that a stable positioning or a position that will prevent tipping over or general leaning is assured. The respective base elements 14, 14', 14" therefore ensure that sufficient stability and a specific orientation or position is obtained for the housing or the individual housing modules 13, 13', 13" of a self-service machine 1.

Based on a particularly expedient feature, the at least one base element 14, 14', 14" comprises at least one concrete body 17, 17', 17" respectively and at least one metal carrier element 18, 18', 18" respectively supported on it. The respective metal carrier element 18, 18', 18" forms the respective support surfaces 16, 16', 16" on the top face for a one-piece machine housing or several housing modules 13, 13', 13" of a self-service machine 1.

FIGS. 3 to 5 illustrate a single base element 14, which is provided as a means of affording a reliable support and for correctly positioning one of the housing modules 13, 13' or 13" in a vertical orientation—FIG. 1. For the sake of simplicity, only one of the base elements 14, 14', 14" which can be aligned with one another in a modular arrangement will be described because the base elements 14, 14', 14" illustrated in FIG. 1 are each of the same design.

The metal carrier element 18 for receiving the load of a housing module 13, which may be of a cabinet or box-shaped design for example, can be adjusted by means of at least one adjusting device 19 relative to the concrete body 17 of the base element 14, in particular can be leveled. This means that the concrete body 17 can be placed askew or inclined within a specific degree, in particular on sloping underlying ground 15, and the metal carrier element 18 can be leveled by adjusting operations undertaken on at least one adjusting device 19 so that a horizontal or as far as possible horizontal support plane 20 is obtained for a housing or housing module 13 of a self-service machine 1. In particular, in spite of the fact that the base element 14 can be placed on uneven and/or sloping underlying ground 15 in any situation, the support plane 20, in particular the carrier element 18, enables a housing module 13 positioned and supported on it to be oriented in a planar or correct, in particular upright, orientation by manually operating the at least one adjusting device 19.

The base element 14 of the corresponding foundation system 2, in particular its adjusting device 19, thus comprises at least one adjusting element 21, in particular at least three, preferably four, adjusting elements 21, 21', 21'', 21''' manually adjustable in the vertical direction. By means of this at least one adjusting element 21, it is possible to move the metal carrier element 18 into a horizontally oriented position relative to the concrete body 17 and relative to the underlying ground 15. By preference, at least three such manually adjustable adjusting elements 21, 21', 21'' are provided. For example, four adjusting elements 21-21''' are provided, in which case a manually adjustable adjusting element 21, 21', 21'', 21''' is disposed respectively at each corner of the carrier element 18, which is of an essentially square shape as seen in plan view. A minimum number of three adjusting elements 21, 21', 21'' which are then positioned in a triangular layout is of practical advantage in terms of obtaining a support plane 20 for a housing module 13 that is as stable as possible and sufficiently horizontal or level starting from a concrete body 17 disposed at an oblique angle or inclined.

The concrete body 17 of the base element 14 is preferably designed as a prefabricated component, which is deposited and positioned at the intended site of the self-service machine 1. In particular, the concrete body 17 is produced by means of a casting mold, by pouring liquid concrete, in particular a mixture of ground stone and cement, into an appropriate casting mold. Once it has set to a sufficient degree, this molded body is unmolded or removed from the mold and once a sufficient final hardness has been obtained, this concrete body 17 is ready to be supplied as a prefabricated part-component for the base element 14. The weight of the concrete body 17 is preferably selected so that it can be manually handled, in particular so that it can be moved without the aid of machinery. This means that the weight of the concrete body 17 should be sufficiently low to enable it to be placed in the desired position at the site without the need for lifting or transport means, i.e. without crane operations. In particular, it is of advantage if the concrete body 17 for a base element 14 can be moved and carried. The use of a manually transportable pallet carrier or wheelbarrow in this context is not interpreted as being a mechanical aid.

The weight of the concrete body 17 is preferably less than approximately 120 kg so that it can be manually unloaded and carried by two to four persons. The concrete body 17 preferably has a weight of between 30 kg and 90 kg, in particular approximately 60 kg. This enables manipulation without the need for mechanical aids in the form of cranes or crane vehicles or fork-lift trucks. The prefabricated concrete body 17 of the corresponding weight is ready for positioning directly at the respective installation site of a self-service machine 1. In particular, there is no need for an additional concrete slab or strip concrete foundation for the self-service machine 1. The corresponding prefabricated concrete body 17 can be deposited directly on a conventional macadam, asphalt or stone floor, such as would be available in a situation where the self-service machine 1 is to be installed outdoors. However, the concrete body 17 may also be placed on all floor surfaces or other floor coverings indoors inside halls or buildings. The underlying ground 15 merely needs to be sufficiently capable of bearing load so that gradual sinking and hence gradual one-sided leaning of the respective machine housing is kept to a minimum. In the situation where a field is the underlying ground or soil, it is merely necessary to remove the relatively soft top surface layer and prepare the underlying ground 15 with a sufficiently thick bed of hardcore, on which the prefabricated concrete body 17 or a plurality of mutually aligned concrete bodies 17-17'' can be directly deposited. The base element 14 can then be rapidly and easily finished by positioning the metal carrier element 18. Alternatively, it is also possible to design the base element 14 as a ready-assembled unit, in which case the base element 14 comprises the concrete body 17, the metal carrier element 18 and the adjusting device 19 and is transported to the respective desired installation site in this form. Again in this case, the weight of the base element 14 should be less than approximately 120 kg to enable it to be moved and manipulated by two to four persons, obviating the need for mechanical aids.

Based on one advantageous embodiment, the concrete body 17 is of an approximately hollow prismatic design. A length of the concrete body 17 is less than one meter, preferably approximately 0.6 m. A width of the concrete body 17 is likewise less than 1 m, in particular approximately 0.5 m. A height of the concrete body 17 is less than 40 cm, preferably approximately 25 cm. In the case of a concrete body 17 based on a hollow prismatic embodiment, its weight may easily be less than 120 kg, in particular approximately 60 kg, thereby enabling manipulation by one person or by two to four persons without any problem. The concrete body 17 is preferably square-shaped, thereby enabling several concrete bodies 17, 17', 17'' to be aligned with one another in a compact arrangement without gaps as far as possible. A cavity 22 disposed in the center region of a square-shaped, hollow prismatic concrete body 17 preferably extends continuously from the top face of the concrete body 17 to the bottom face of the concrete body 17. In particular, the cavity 22 of the concrete body 17 is formed by at least one vertically oriented or vertically extending orifice 23 in the concrete body 17. This at least one orifice 23 on the one hand reduces the weight of the concrete body 17 and secondly, this orifice 23 can advantageously also be used as an installation and cabling duct for connecting cables of the self-service machine 1, in particular for accommodating cable connections. In particular, cables run out from the underlying ground 15 can be run through the concrete body 17 into the respective housing or housing module 13, 13', 13'', in particular into the controller housing 11—FIG. 1—of the self-service machine 1. This makes installation quick and effortless. Furthermore, the respective cables are efficiently and reliably protected from manipulation and damage. This means that the cavity 22 of the at least one concrete body 17 serves as a housing or running space for line connections, in particular for cable connections, between mutually aligned housing modules 13, 13', 13'' and/or between at least one housing module 13, 13', 13'' and a controller housing 11. This also obviates the need for additional drilling or cutting operations, thereby enabling the respective self-service machines 1 to be assembled as rapidly as possible and with the minimum possible in terms of tool requirements.

The square-shaped concrete body 17 is preferably surrounded on at least two mutually opposing wall portions 24, 25 and at least partially on its top face 26 by the metal carrier element 18. In particular, the wall portion 24 constituting the front face and preferably also the wall portion 25 constituting the rear face of the concrete body 17 is at least partially covered by the carrier element 18. The metal carrier element 18 is preferably disposed on the concrete body 17 in a hood-type arrangement, and at least two mutually opposing wall portions 24, 25, in particular the front and rear face, and the top face 26 of the concrete body 17 are surrounded or faced by a preferably plate-type carrier element 18 at least partially or in certain regions. Based on one advantageous embodiment, which may be seen in particular in FIG. 5, the metal carrier element 18 has an approximately C-shaped geometry as viewed in vertical section. A base element 27 of this C-shaped body thus at least partially covers the top face 26 of the concrete body 17. Mutually opposing arms 28, 29 of this C-shaped body as viewed in vertical section thus constitute facing portions 30, 31, which at least partially cover or face the mutually opposing wall portions 24, 25 of the concrete body 17.

The carrier element 18 is preferably an integral sheet metal part. In particular, the arms 28, 29 of the carrier element 18 are formed by edge portions folded back against a plate-shaped base element 27. The arms 28, 29 of the carrier element 18 thus form facing portions 30, 31 around the front and rear face; in particular at least partially covering the front and rear wall portions 24, 25 of the concrete body 17, on the one hand. In addition, these arms 28, 29 impart stiffness to the carrier element 18. In particular, the plate-shaped base element 27 is rendered much stiffer by the at least two mutually opposing arms 28, 29 so that in spite of being a lightweight structure, it is capable of absorbing relatively high loads without much deformation. The carrier element 18 is preferably provided in the form of a shaped sheet metal component, in particular bent and punched. Alternatively, however, it would also be conceivable for the metal carrier element 18 to be made up of several parts, and in particular the arms 28, 29 might be made as separate components and joined to the plate-shaped base element 27, in particular screwed to it. Naturally, it would also be possible to provide facing portions 30, 31 made from a different type of material, in particular plastic, in order to simplify any processing they might need.

The dimensioning of these facing portions 30, 31 is preferably selected so that, in very position of the carrier element 18 relative to the concrete base 17, the facing portions 30, 31 cover at least some portions of its wall surfaces, in particular part-portions of its front and/or rear wall portions 24, 25. In particular, the at least one facing element 30, 31 is dimensioned in terms of its vertical height 32 so that even when the adjusting device 19 is in its maximum extended position between the concrete base 17 and the facing element 30 and/or 31, a mutual overlap 33 remains relative to the vertical direction. In particular, at least on the front face of the base element 14, the arm 28 or the corresponding facing portion 30 is dimensioned to be high enough so that an overlap 33 is created in all permissible adjustment positions of the adjusting device 19, thereby preventing a gap from being created in the vertical direction between the concrete body 17 and the carrier element 18. In this respect, FIG. 3 illustrates the maximum retracted or lowered position of the adjusting device 19 and carrier element 18, whereas FIG. 4 illustrates the maximum extracted or raised position of the adjusting device 19 and carrier element 18.

As may also best be seen from FIG. 5, the metal carrier element 18 is provided in the form of a plate-shaped, essentially flat base element 27. A housing module 13, 13', 13" of a self-service machine 1—FIG. 1—assembled on a modular basis can be supported on this at least approximately flat base element 27. The base element 27 thus constitutes an element which can be leveled or a platform element which enables the top face, in particular the support plane 20, on the carrier element 18 to be leveled to a certain extent irrespective of the position, in particular a skew position, of the concrete body 17. To this end, a manual adjustment is undertaken on the adjusting device 19 of the base element 14, in particular on at least one adjusting element 21, 21', 21", 21'''.

The plate-shaped base element 27 based on one advantageous embodiment has a central orifice 34. At least two peripheral portions 35, 35' respectively 36, 36' of the carrier element 18 adjoining this orifice 34, preferably all the peripheral portions 35, 35' and 36, 36' of the base element 27 disposed around the orifice 34, are designed to provide a load-bearing support for the outer peripheral regions, in particular the wall portions, of a cabinet-type housing module 13, 13', 13". This means that the wall portions of a housing module 13, 13', 13" are primarily supported so that the load is borne on the peripheral portions 35, 35', 36, 36' of the carrier element 18, whilst the center region of the base portion of a housing module 13, 13', 13" is left open with respect to the central portion of the carrier element 18.

The structure and mode of operation of the adjusting device 19 used to level and/or adjust the height of the support plane 20 and metal carrier element 18 may be most easily seen by comparing FIGS. 5 to 8. The at least one adjusting element 21, 21', 21", 21''' of the adjusting device 19 can be manually operated, in particular can be operated with the aid of a screwdriver or an Allen key. Such an adjusting element 21, illustrated in detail in FIGS. 6 to 8, comprises a threaded bolt 37, in particular a threaded screw, in the form of a socket head screw, oriented essentially perpendicular to the top face 26 of the concrete body 17. When the concrete body 17 is disposed in an approximately horizontal orientation, the threaded bolt 37 is therefore essentially vertically oriented. By turning the threaded bolt 37, its vertical protuberance 38 beyond the concrete body 17, in particular beyond its top face 26, can be adjusted. This means that the vertical extra dimension or protuberance 38 as measured in the vertical direction can be varied if necessary by screwing in or screwing out the threaded bolt 37 relative to the concrete body 17 in an individually adapted manner. By providing at least three, preferably four such adjusting elements 21, 21', 21", 21''' therefore, a horizontally oriented support plane 20 and a horizontally oriented carrier element 18 can be achieved, even if the concrete body 17 is positioned askew or is inclined due to the contours or unevenness of the underlying ground 15.

To this end, the adjusting device 19 also comprises at least one threaded sleeve 39 complementing the threaded bolt 37, preferably cast into the concrete body 17, for example a nut 40. Alternatively, instead of using a threaded sleeve 39 and a nut 40, it would also be possible to insert or cast a threaded plate in the concrete body 17. The essential aspect is that this threaded sleeve 39 or nut 40 or threaded plate is secured so that it cannot turn relative to the concrete body 17 and above all is capable of transmitting the downward loads occurring in the direction perpendicular to the concrete body 17 without deforming or damaging the threaded sleeve 39 or nut 40 or a corresponding threaded plate.

The threaded bolt 37 supports the metal carrier element 18 relative to the concrete body 17 either directly or preferably via an interconnected support head 41. This support head 41 is preferably disposed at the end portion of the threaded bolt 37 remote from the concrete body 17. The support head 41 has at least one support surface 42 on its top face, on which the bottom face of the carrier element 18 is supported in a load-transmitting arrangement.

Based on one advantageous embodiment, the support head 41, which is preferably disposed at the end portion of the threaded bolt 37 remote from the concrete body 17, is mounted so that its angle can be adjusted relative to the threaded bolt 37. This means that an adjustment can be made to the angular position or mutual orientation between the threaded bolt 37 and the support head 41. In particular, due to the fact that this angle can be varied, the orientation of the support surface 42 of the support head 41 is variable or can be varied relative to the longitudinal axis of the threaded bolt 37, in particular it can be horizontally oriented. Consequently, even if the threaded bolt 37 extends at an angle or is inclined, a horizontally oriented support surface 42 can be obtained and consequently as flat as possible a bearing of the carrier element 18 on the top face or support surface 42 of the support head 41. The support head 41 can be inclined about at least two co-ordinate axes extending transversely to the longitudinal axis of the threaded bolt 37. For practical purposes, therefore, the support head 41 is mounted so as to articulate relative to the threaded bolt 37, in particular in the manner of a universal joint or more or less as a universal joint.

Based on one advantageous embodiment, the threaded bolt 37 extends at least partially through the support head 41, as may be seen from FIG. 7 for example. At least a part-portion of a co-operating orifice 43 in the support head 41, through which orifice 43 the top end portion of the threaded bolt 37 extends, is preferably of a conical hollow design. In particular, the boundary surfaces of the orifice 43 are approximately conical, as may best be seen from FIG. 7. Based on one advantageous embodiment, a screw head 44 of a threaded bolt 37 in the form of a threaded screw is countersunk or recessed in a recess 45 of the support head 41.

The support head 41 is therefore supported relative to the threaded bolt 37 in a load-transmitting arrangement by means of a first, in particular by means of a bottom support surface 46 so that a relative adjustment of the support head 41 in the axial direction of the threaded bolt 37 is at least largely prevented. The support head 41 is preferably supported in a load-transmitting arrangement relative to the threaded bolt 37 via an interconnected elastically flexible or elastically deformable element 47. This elastically flexible element 47 serves as a spring-like compensating element so that the support head 41 is mounted to enable its inclination or angle to be varied relative to the threaded bolt 37 against the force of this elastically flexible element 47. The force of the elastically flexible element 47 thus causes the support head 41 and its support surface 42 to be forced into a position oriented at a right angle to the longitudinal axis of the threaded bolt 37.

As may easily be seen from a comparison of FIGS. 6 to 8, the support head 41 can be inclined relative to the threaded bolt 37 as the force acts accordingly and causes this inclining movement opposing the force of the at least one, resiliently elastic flexible element 47. This results in a robust and at the same time inexpensive articulated connection between the support head 41 and the threaded bolt 37. Alternatively, instead of using the described compensating element or instead of using the resilient element 47 in conjunction with a conical or wedge-shaped orifice 43 in the support head 41, it would naturally also be possible to opt for a type of ball-cup joint.

Based on a preferred embodiment, the support head 41 is positioned so as to be elastically flexible relative to the longitudinal axis of the threaded bolt 37 via an interconnected bottom and top elastic element 47, 47', as illustrated in FIG. 7. The elastic flexibility is a few millimeters, in particular less than approximately 2 mm. The essential aspect of this is that the inclination of the support surface 42 on the support head 41 can be varied relative to the longitudinal axis of the threaded bolt 37 by up to 10°. Typically, a change in inclination of up to 5° is sufficient.

Based on a preferred embodiment, the at least one elastically flexible element 47, 47' is provided in the form of at least one plate spring 48, 48' threaded over the threaded bolt 37. The threaded bolt 37 therefore extends through the support head 41 with a defined, radial clearance 49, thereby imparting the load-dependent capacity to vary the inclination of the support head 41 relative to the threaded bolt 37. The screw head 44, in particular its form-fitting means, is accessible from the top face of the support head 41 due to the recess 45 in the support surface 42. In particular, the threaded bolt 37 can be turned using a complementary hexagon head tool. Depending on the number of turns or for each change in the angle of rotation of the threaded bolt 37, the support head 41 is raised or lowered relative to the top face 26 of the concrete body 17. The support head 41 is mounted so that it can be displaced in rotation relative to the threaded bolt 37 about its longitudinal axis. In particular, the radial clearance 49 between the top end, in particular between the shaft of the threaded bolt 37 and the orifice 43 in the support head 41, enables a rotating movement so that the support head 41 can be rigidly connected to the carrier element 18 by means of at least one screw connection 50, 50', as may best be seen by comparing FIGS. 5 and 6. In the state fixedly connected to the support head 41, the carrier element 18 therefore causes the support surfaces 42 of each adjusting element 21, 21', 21", 21'" to be disposed in a common plane, in particular in a plane parallel with the support plane 20. This results in a multi-point support for the carrier element 18, and the respective support zones for the carrier element 18 occupy the largest possible surface, corresponding in particular to the size of the support surfaces 42. Since the support heads 41 are able to move freely in articulation relative to the respective threaded bolts 37 or due to the described articulated mounting of the support heads 41 elastically returning them into a defined initial position, strain and distortion in the carrier element 18 is avoided as far as possible and a defined support or bearing for the carrier element 18 is obtained due to the compensating articulating movement of the respective support heads 41. An articulated connection 51 of this type between the support head 41 and the threaded bolt 37 on the one hand helps to secure a stable and defined connection between the carrier element 18 and the at least one adjusting element 21, 21', 21", 21'" and on the other hand makes it easier to adjust the base element 14 and assemble the self-service machine 1.

In addition to an articulated connection 51 between the support head 41 and threaded bolt 37, it is preferable to provide a relatively displaceable connection 52 that is adjustable in translation between at least one of the adjusting elements 21, 21', 21", 21'", in particular between their support heads 41, and the carrier element 18 as well. This connection 52 which is relatively displaceable in translation thus permits an individually adjustable relative displacement between the carrier element 18 and concrete body 17 within the support plane 20 for a housing module 13—FIG. 1. The carrier element 18 can be displaced relative to the concrete body 17, in particular relative to the at least one support head 41, within the support plane 20. Based on one advantageous embodiment, this relatively displaceable connection 52 has at least one slot-shaped orifice 53, 53', which interacts with the at least one screw connection 50, 50' between the carrier element 18 and the at least one adjusting element 21, 21', 21", 21'". In particular, this relatively displaceable connection 52 between the carrier element 18 and the at least one adjusting element 21, 21', 21", 21'", in particular relative to its at least one support head 41, enables a horizontally oriented carrier element 18 to be positioned as far as possible centrally above the concrete body 17. Especially if the concrete body 17 is placed at an oblique angle and the carrier element 18 was then leveled, i.e. moved into a horizontal plane, a central or as far as possible central positioning of the carrier element 18 above the concrete base 17 is obtained. Above all, if several base elements 14, 14', 14" are aligned in a row adjacent to one another—FIG. 1—a gap dimension between adjacently lying carrier elements 18 or facing portions 30, 31 is made uniform or compensated. This means that the metal carrier element 18 is laterally adjustable relative to the preferably metal support head 41 in order to avoid different gap dimensions between consecutive facing portions 30 respectively 31 or in order to adjust them so that they are as uniform as possible. Especially if the carrier element 18 has been leveled by means of at least one adjusting element 21, 21', 21", 21'" and the lateral gap dimensions facing adjoining carrier elements 18 have been compensated or made as uniform as possible, the screw connections 50, 50' between the individual support heads 41 and the respective carrier elements 18 are tightened, whereupon a stable support platform for housing modules 13, 13', 13" of a self-service machine 1 is obtained. Based on one practical embodiment, the lateral relatively adjustable connection 52 is provided in the form of a simple screw-slot connection between the plate-shaped base element 27 and the respective support heads 41 of the adjusting elements 21, 21', 21", 21'", as may best be seen from FIG. 5.

Based on one practical embodiment, at least one opening 55, 55' is provided in the base portion of the housing modules 13, 13', 13", in particular in their base plate 54, via which the adjusting device 19, in particular the height adjusting device, as well as the lateral or trans-verse adjusting device for the carrier element 18 described above are accessible from the interior of the respective housing module 13, 13', 13", even if a housing module 13, 13', 13" has already been secured to the carrier element 18. The at least one opening 55, 55' in the base, in particular in the base plate 54, of the at least one housing module 13, 13', 13" is therefore positioned so that at least one height adjustment of the carrier element 18 in at least one corner region, preferably in all corners, of the carrier element 18, can be undertaken. Accessibility is preferably also afforded in addition for the lateral or translating adjustment of the relatively displaceable connection 52, in particular by releasing or loosening the screw connection 50, 50'. The respective openings 55, 55' in the base plate 54 can be closed again by means of cover or lid elements, although these are not illustrated, once the adjustment has been made, to prevent objects from becoming hooked on or dropping through the opening 55, 55'. Alternatively, it would also be possible to design the base plate 54 in the housing modules 13, 13', 13" so that they can be removed or raised to permit access to the adjusting device 19, in particular to the adjusting elements 21, 21', 21", 21'" and/or to the respective connections 52 that are adjustable in translation.

When the self-service machine 1 is in the correctly assembled state, it, and in particular its at least one housing module 13, 13', 13", is connected to the carrier element 18 respectively 18' respectively 18" so that it cannot be detached. This connection may be established on the basis of a form-fitting connection or a combination of a form-fitting connection and screw connection. In particular, the base portion or base plate 54 of the respective housing module 13, 13', 13" is anchored reliably and with a sufficiently strong retaining force to the respective carrier element 18, 18', 18" to prevent the housing module 13, 13', 13" from tipping over or falling off the platform-type base element 14 respectively 14' respectively 14". To enable a readjustment or to enable a first leveling operation to be carried out, the adjusting device 19 can be accessed at any time. Via the at least one opening 55, 55' in the base portion or by removing or lifting the base plate 54, adjustments can be made to the at least one adjusting element 21, 21', 21", 21'".

Figure 10:
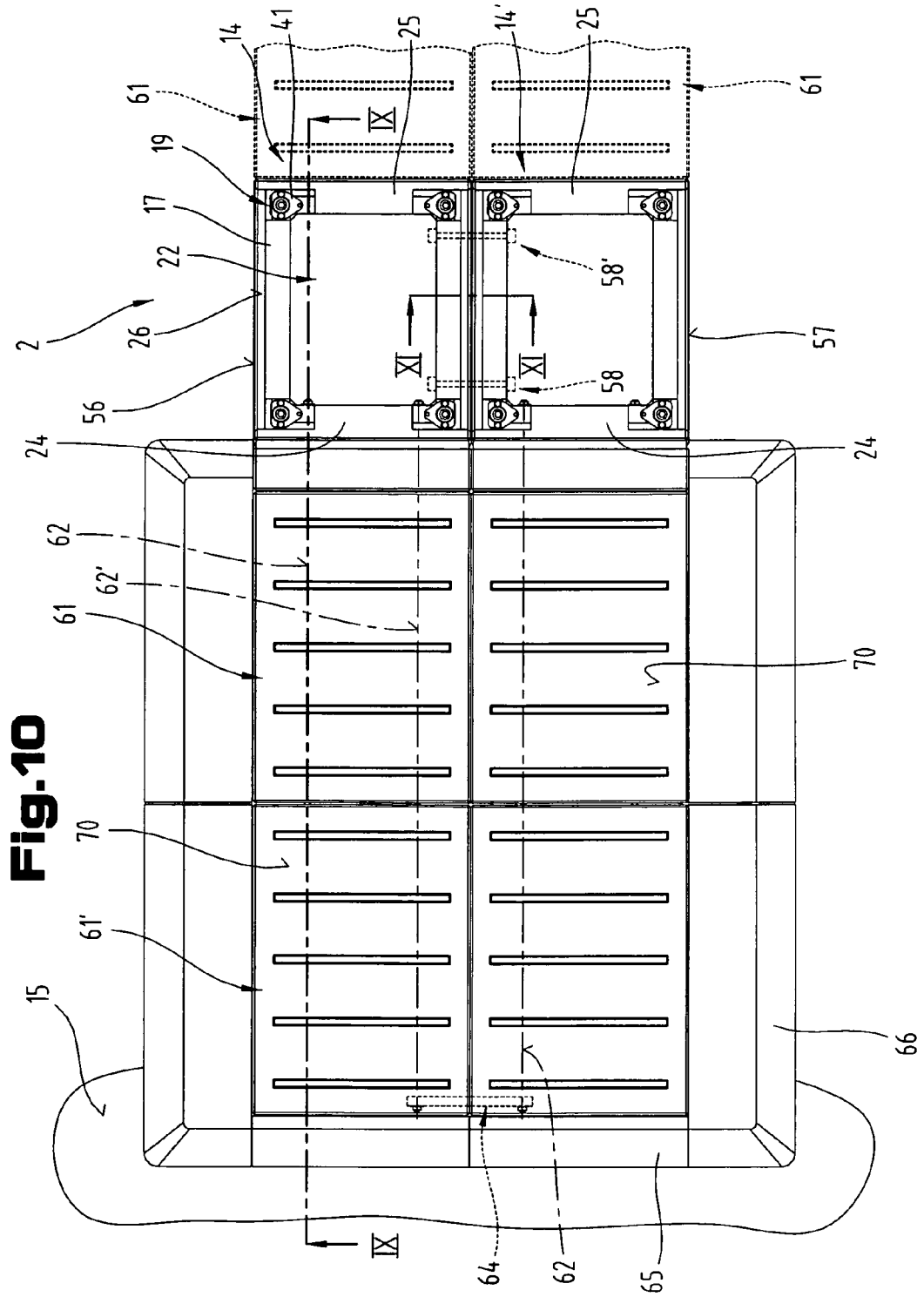
FIG. 10 is a plan view of the foundation system illustrated in FIG. 9.
Figure 11:
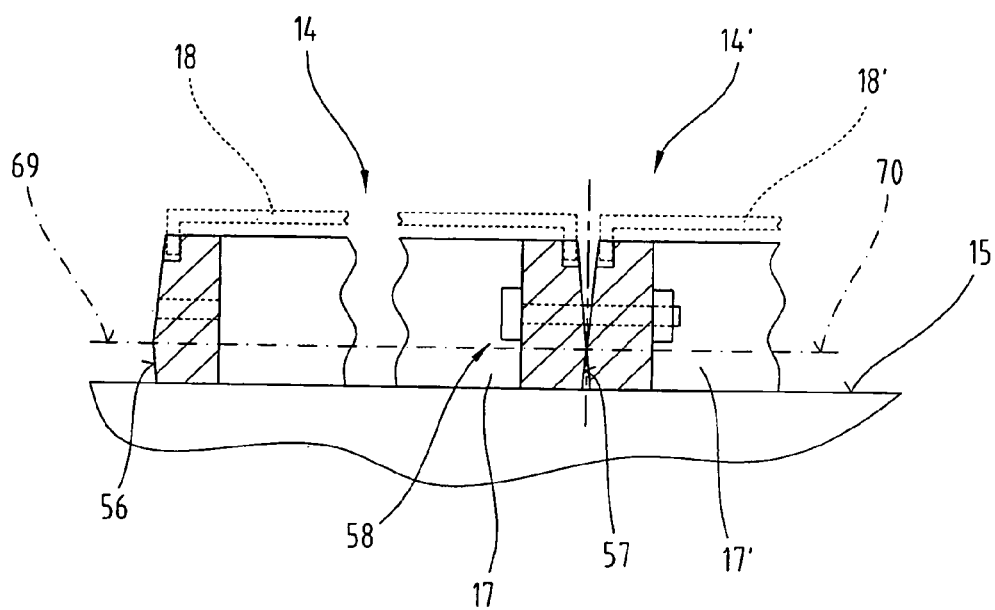
FIG. 11 is a vertical section illustrating two mutually aligned base elements or concrete bodies of the foundation system.

As may best be seen from FIGS. 9 to 11, several base elements 14, 14' can be aligned with one another in a row essentially without any gaps. The base elements 14, 14' are each of the same design. Accordingly, the number of base elements 14 may be increased or reduced from one end or from both ends of this row if necessary. Particularly for the situation in which a higher number of housing modules is necessary, at least one other base element can be added to an already existing row of base elements 14 and another housing module can be placed on this base element, thereby enabling the storage capacity of the self-service machine 1—FIG. 1—to be increased. The underlying ground 15 does not have to be absolutely flat for this purpose. Since the base elements 14 can be compensated, the self-service machine 1 can be extended relatively quickly if there is a certain amount of unevenness. For example, even if there is a gradient of up to 5%, an already existing self-service machine 1 can be fitted or extended with few problems. The same applies if erecting a new self-service machine 1.

As may best be seen from FIG. 11, the respective base elements 14, 14', in particular their concrete bodies 17, 17', can be aligned with one another in a row essentially without gaps. Mutually opposing side walls 56, 57 of the concrete bodies 17, 17' extend, by reference to their external surfaces, from the base portion of the concrete bodies 17, 17' in the direction towards their top end portion as far as a first horizontal plane 69, diverging slightly and then converging slightly so that, by reference to a vertical section through the side walls 56, 57, their external or wall surfaces are respectively cambered or at least part-surfaces are oriented towards one another at an obtuse angle.

This means that the concrete bodies 17, 17' have at least two mutually opposing side walls 56, 57, the external surfaces of which are oriented towards one another in a slight V-shape in the bottom portion and the external surfaces of which converge towards one another again in the top end portion so that the concrete bodies 17, 17' assume their maximum width within a horizontal plane 69 between the top face and bottom face of the concrete bodies 17, 17', as may best be seen from FIG. 11. In particular, the external surfaces of the side walls 56, 57 of the concrete bodies 17, 17' extend from this horizontal plane 69 in the upward and downward direction together in each case. A corresponding transition edge of the concrete bodies 17, 17' disposed approximately on a level with the horizontal plane 69 may also be seen in the diagrams of the base elements 14, 14, 14' shown in FIGS. 3-5. The height level of the horizontal plane 69 relative to the underlying ground 15 therefore approximately corresponds to a height level of a stepping surface 70 to be walked on by a user on a paved front portion—FIG. 1—of the self-service machine 1.

This makes it possible to guarantee an alignment of base elements 14, 14' directly one against the other as far as possible without any gaps, even in the event of a sloping positioning surface with a dip or relatively uneven underlying ground 15. This is primarily of advantage in terms of obtaining a stable and as far as possible wobble-free positioning of a self-service machine 1 comprising several modules. In particular, adjacent concrete bodies 17, 17' are mutually supported as a result, thereby resulting in increased stability due to a relatively clearance-free connection transmitting forces or also due to a biasing effect between adjacent base elements 14, 14'.

Based on one practical embodiment, mutually aligned base elements 14, 14', in particular their concrete bodies 17, 17', are connected to one another so that they are not able to drift apart from one another. To this end, at least one screw connection 58, 58' is provided between adjacent concrete bodies 17, 17'. This mutual coupling, in particular the screw connection 58, 58', is such that any tilting or lifting of a first concrete body 17 would also cause the adjacent concrete body 17' to lift. However, the individual base elements 14, 14' and their concrete bodies 17, 17' are coupled by the screw connections 58, 58' so as to articulate in a certain manner, thereby enabling an alignment of concrete bodies 17, 17' to adapt to any unevenness in the underlying ground 15 to a certain degree in a buckling and undulating arrangement. In terms of vertical relative shifting or tipping movements, however, the concrete bodies 17, 17' are coupled so that they move with one another, in particular with as little clearance as possible. Due to this articulated coupling between adjacent base elements 14, 14' akin to a chain linkage, the resultant stability and stability under load of the mutually aligned base elements 14, 14' used to accommodate the respective housing modules or housing of the self-service machine 1—FIG. 1—are significantly improved. A virtual articulation axis between adjacent base elements 14, 14', in particular between mutually coupled concrete bodies 17, 17', extends essentially parallel with the support plane 20 and underlying ground 15.

In the embodiment illustrated as an example, two screw connections 58, 58' are provided respectively between two adjacent base elements 14, 14'. Instead of screw connections 58, 58', it would also be possible to use some other form-fitting connections, for example groove and tongue connections, between mutually aligned concrete bodies 17, 17' and thus prevent or reduce to a minimum any relative displacement between adjacent concrete bodies 17, 17' in the direction perpendicular to the underlying ground 15 and improve the stability and stability under load of the base elements 14, 14'. Based on one practical embodiment, the individual housing modules 13, 13', 13" are primarily supported on the respective base modules 14, 14', 14" in a load-transmitting arrangement. A mutual connection between the individual housing modules 13, 13', 13" which enables them to move rigidly is preferably not provided. This means that the individual cabinet bodies or housing modules 13, 13', 13" are of a virtually self-supporting design and mutually adjacent wall portions of housing modules 13, 13', 13" are not rigidly connected to one another, at least when they are being assembled, and instead are left so they are able to move relatively speaking. In particular, it should still be possible for there to be a certain amount of relative movement between the individual wall portions of the housing modules 13, 13', 13" within a vertically extending transition plane or transition interface. This avoids tensions between the individual housing modules 13, 13', 13" and hence any associated detrimental effects in terms of accuracy to gage and keeping an orientation of the housing modules 13, 13', 13" that is as straight or true as possible. In particular, mutual straining and hence any associated jamming of compartment doors on holding compartments 5, 5', 5"—FIG. 1—can be reliably avoided or kept to a minimum. In particular, a first housing module 13 based on cabinet-type design is supported in a load-transmitting arrangement on a first base element 14*t*. This housing module 13 is loosely aligned with an adjacent housing module 13' of a cabinet-type design supported on another base element 14' essentially without any gap so that it remains free to move relative to the adjacent housing module 13 at least within a vertical plane, in particular by reference to a vertical dividing plane between the adjacent housing modules 13, 13'. This capacity for relative movement is particularly useful at least when carrying out adjustment operations because it prevents mutual strain and associated torsion in the mutually aligned housing modules 13, 13', 13". Once adjacent housing modules 13, 13', 13" have been correctly oriented, a mutual connection may optionally be established, for example a clamped or screw connection, in order to increase the stiffness of the housing modules 13, 13', 13" and the housing bodies built from them if necessary.

As may be seen from the diagrams shown in FIGS. 9, 10, at least one paving element 61, 61' made from concrete may be aligned along at least one side, in particular the front face 59 and/or the rear face 60 of the base element 14, 14'. Based on one practical embodiment, a concrete paving element 61, 61' is disposed in particular in the region of the front face 59 of the base element 14, 14', which forms a paved front area or approach area for the self-service machine 1, as may also be seen from FIG. 1. The at least one paving element 61, 61' is connected to the respective base element 14,14', in particular to its concrete body 17, 17', so that it cannot be detached and is not able to move. In particular, this at least prevents any drifting of the at least one paving element 61, 61' relative to the base element 14, 14'. This connection is preferably such that by reference to the mutually facing portions, a deviating movement or relative movement between the base element 14, 14' and a paving element 61, 61' connected to it is prevented or at least largely prevented in the direction perpendicular to the underlying ground 15. However, this connection should permit a certain change of angle between two adjoining paving elements 61, 61' so that the surfaces of adjacent paving elements 61, 61' forming respective stepping surfaces 70 for a user are able to subtend an angle other than 180°. Furthermore, it should be possible to obtain a certain change of angle or variable inclination between a base element 14, 14' and an adjoining paving element 61 in order to compensate for a certain degree of unevenness, in particular irregularities in the underlying ground 15, and to obtain as full and "intimate" a support as possible of the paving elements 61, 61' and the at least one concrete base 17, 17' on the underlying ground 15.

The connection between the base element 14, 14' and the at least one paving element 61, 61' is provided in the form of at least one cable or rod connection 62, 62' extending at least partially through the paving element 61, 61' and base element 14, 14'. This cable or rod connection 62, 62' may be lengthened or shortened as necessary, depending above all on the respective number of mutually aligned paving elements 61, 61' needed, as may be seen in particular from the diagram illustrated in FIG. 9. In particular, the cable or rod connection 62, 62' comprises at least one threaded portion 63, 63' by means of which the cable or rod connection 62, 62' can be shortened or lengthened as necessary, and can be tensioned once the desired tensioning length has been reached in order to prevent individual paving elements 61, 61' drifting apart or drifting away from the base element 14, 14' and vice versa. The fact that this cable or rod connection 62, 62' can be extended or shortened makes assembly very practical and results in the shortest possible construction time. Depending on the length of the approach area or depending on the length and number of paving elements 61, 61', therefore, it will be necessary to use a specifically adapted length of at least one cable or rod connection 62, 62' to enable these paving elements 61, 61' to be connected to the base element 14, 14', in particular to its concrete body 17, 17', so that they cannot move but can articulate within the standing plane. The at least one cable or rod connection 62, 62' between the at least one paving element 61, 61' and the at least one concrete body 17, 17' thus forms a sort of linked chain by means of which the individual elements, in particular the paving elements 61, 61' and base elements 14, 14', are secured to prevent them from drifting apart but remain linked to one another to a certain degree.

At least the front ends of adjacently aligned paving elements 61, 61' disposed remote from mutually aligned base elements 14, 14' are preferably secured by means of at least one plate connection 64 to prevent them from drifting apart, as illustrated in FIG. 10 for example. The plate connection 64 may be provided in the form of a simple connecting flange which connects the ends of the cable or rod connection 62, 62' remote from the base element 14, 14' to two adjacent rows of paving elements 61, 61'. This plate connection 64 permits some angling between adjacent rows of paving elements so that they can conform as far as possible to irregularities in the underlying ground 15. However, any unhindered vertical relative movement between adjacent paving elements 61, 61' is prevented by this plate connection 64 or is prevented to a certain degree.

This plate connection 64 between adjacent paving elements 61, 61' can be covered by means of at least one strip element 65, 66, which is preferably likewise made from concrete. This at least one strip element 65, 66 is secured to the paving elements 61, 61' to prevent any drifting. In particular, the at least one strip element 65, 66 is fixedly connected to at least one paving element 61, 61' so that it cannot be detached. This connection may be provided in the form of a hook or clamp connection or alternatively by a screw connection. The strip elements 65, 66 may be disposed on the front face and also on the lateral peripheral portions of the paving elements 61, 61' in order to obtain a defined finish to this approach-way body of concrete. Instead of a screw or clamp connection, it would also be possible to secure the strip elements 65, 66 by means of at least one form-fitting, locating connection to prevent drifting from the paving elements 61, 61'.

Based on one advantageous embodiment, at least two mutually opposing wall portions of the paving elements 61, 61' are oriented in a diverging arrangement starting from their base portions in the direction towards their top faces. This ensures that an alignment of paving elements 61, 61' is obtained that is as free of gaps as possible, even if the underlying ground 15 is undulating or uneven in any way. In particular, this then results in a stepping surface 70 or standing plane for the user of the self-service machine 1—FIG. 1—that is as free of gaps as far as possible if the underlying ground 15 beneath the paving elements 61, 61' is relatively uneven or undulating.

The essential aspect is that a base element 14 in conjunction with at least one paving element 61, 61' of concrete relatively rapidly offers a high degree of stability for the housing or the corresponding housing module 13, 13', 13" of the self-service machine 1, thereby obviating the need for separate anchoring of the base element 14, 14', 14" or paving elements 61, 61' with respect to the underlying ground 15. In particular, the connection between the at least one concrete body 17, 17' of the at least one base element 14, 14' and the at least one paving element 61, 61' of concrete means that a sort of base footing is created which significantly increases the stability of this foundation system 2. In particular, the relatively high weight of this foundation system 2 close to the ground has a positive effect on the stability of the self-service machine 1 under load and on the housing modules 13, 13', 13" standing on it. The high stability under load can therefore be easily and efficiently obtained due to the mechanical connection or coupling in displacement between several prefabricated concrete bodies, each of which can be carried and manually manipulated.

As may be seen in particular from FIG. 9, mutually adjacent walls of an alignment of concrete bodies 17, 17' may each have at least one wall portion 67 which can be broken open or removed if necessary. This wall portion 67 which may be broken open if necessary constitutes an intended breaking point in the mutually opposing side walls 56, 57 of a concrete body 17 so that a passage can be created for cable connections if necessary. This offers a rapid and extremely simple way of installing a self-service machine 1 and in particular requires very little in the way of tools.

Based on one advantageous embodiment, at least one lamp unit 68, 68' is integrated in at least one paving element 61, 61' of the plate-shaped concrete body in front of the self-service machine 1, as illustrated by way of example in FIG. 1. This at least one lamp units 68, 68' integrated flush with or at least approximately flush with the floor approach structure of prefabricated concrete slabs is provided as a means of illuminating the area surrounding a self-service machine 1 and/or illuminating the front face or interior of opened holding compartments 5, 5', 5"' of a safety-deposit machine 3. The at least one lamp unit 68, 68' may be provided in the form of standard halogen or LED lamp and is preferably activated and deactivated depending on the light.

FIGS. 12a, 12b illustrate an advantageous way in which the foundation system 2 works. As may be seen, the foundation system 2 may also be placed on uneven areas or underlying ground 15. Due to the fact that the height and lateral orientation of the base elements 14, 14', 14", in particular their carrier elements 18, 18', 18", can be individually adjusted, it is possible to obtain a horizontal, even support plane 20 for the housing modules 13, 13', 13". The gap dimensions between adjacent housing modules 13, 13', 13" can also be made uniform or compensated due to the translating connection 52 described above—see FIGS. 3-5.

Especially in the case of steep gradients and long rows, it is also possible to provide at least one step, in which case the individual housing modules 13, 13', 13" or groups of housing modules 13, 13', 13" may be placed respectively on different horizontally oriented support planes 20, 20', 20", as illustrated in FIGS. 13a, 13b. It is also possible to position directly aligned housing modules 13 and 13' respectively 13' and 13" of a self-service machine 1 respectively on different horizontally oriented support planes 20, 20', 20".

The embodiments illustrated as examples represent possible variants of the foundation system 2 and the self-service machine 1 positioned on it, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the foundation system 2, it and its constituent parts are illustrated to a certain extent out of scale and/or on an enlarged scale and/or on a reduced scale.

The objective underlying the independent inventive solutions may be found in the description. Above all, the individual embodiments of the subject matter illustrated in FIGS. 1; 2-5; 6-8; 9-11; 12; 13 constitute independent solutions proposed by the invention in their own right. The objectives and associated solutions proposed by the invention may be found in the detailed descriptions of these drawings.

List Of Reference Numbers

| | |
|---|---|
| 1 | Self-service machine |
| 2 | Foundation system |
| 3 | Safety-deposit machine |
| 4 | Identification device |
| 5, 5', 5" | Holding compartment |
| 6 | Compartment system |
| 7 | Control device |
| 8 | Input and/or output device |
| 9 | Goods identification means |
| 10 | Payment module |
| 11 | Controller housing |
| 12, 12' | Compartment module |
| 13, 13', 13" | Housing module |
| 14, 14', 14" | Base element |
| 15 | Underlying ground |
| 16, 16', 16" | Support surface |
| 17, 17', 17" | Concrete body |
| 18, 18', 18" | Carrier element |
| 19 | Adjusting mechanism |
| 20, 20', 20" | Support plane |
| 21, 21', 21", 21''' | Adjusting element |
| 22 | Cavity |
| 23 | Orifice |
| 24 | Wall portion |
| 25 | Wall portion |
| 26 | Top face |
| 27 | Base element |
| 28 | Arm |
| 29 | Arm |
| 30 | Facing portion |
| 31 | Facing portion |
| 32 | Height |
| 33 | Overlap |
| 34 | Orifice |
| 35, 35' | Peripheral portion |
| 36, 36' | Peripheral portion |
| 37 | Threaded bolt |
| 38 | Protuberance |
| 39 | Threaded sleeve |
| 40 | Nut |
| 41 | Support head |
| 42 | Support surface |
| 43 | Orifice |
| 44 | Screw head |
| 45 | Recess |
| 46 | Support surface |
| 47, 47' | Element |
| 48, 48' | Plate spring |
| 49 | Clearance |
| 50, 50' | Screw connection |
| 51 | Articulated connection |
| 52 | Translating connection |
| 53, 53' | Orifice |
| 54 | Base plate |
| 55, 55' | Opening |
| 56 | Side wall |
| 57 | Side wall |
| 58, 58' | Screw connection |
| 59 | Front face |
| 60 | Rear face |
| 61, 61' | Paving element |
| 62, 62' | Cable or rod connection |
| 63, 63' | Threaded portion |
| 64 | Plate connection |
| 65 | Strip element |
| 66 | Strip element |
| 67 | Wall portion |
| 68, 68' | Lamp unit |
| 69 | Horizontal plane |
| 70 | Stepping surface |

The invention claimed is:

1. Foundation system for receiving the load of a housing or at least one housing module of a self-service machine, the foundation system comprising at least one base element, at least one paving element, and at least one adjusting device, the at least one base element having at least one support surface for a housing or for at least one housing module of a self-service machine,
   wherein the at least one base element comprises a concrete body and at least one metal carrier element supported thereon,
   wherein the at least one metal carrier element can be leveled relative to the concrete body via the at least one adjusting device,
   wherein the at least one paving element of concrete can be aligned along a front face and/or a rear face of the at least one base element in order to form a paved front area or approach area for a user of the self-service machine and the at least one paving element is connected to the concrete body so that the at least one paving element is prevented from drifting relative to the at least one base element, and
   wherein the concrete body has a hollow prismatic shape and has a cavity extending continuously from a top face of the concrete body to a bottom face of the concrete body, thereby forming a vertically oriented orifice.

2. Foundation system according to claim 1, wherein the at least one metal carrier element comprises a hood at least partially covering the concrete body.

3. Foundation system according to claim 1, wherein the at least one metal carrier element has a C-shaped body by reference to a vertical section, and a base element of the C-shaped body covers at least certain portions of a top face of the concrete body, and mutually opposing arms of the C-shaped body constitute facing portions at least partially covering mutually opposing wall portions of the concrete body.

4. Foundation system according to claim 1, wherein the concrete body is a prefabricated component with a weight selected so that the concrete body can be laid without mechanical aids.

5. Foundation system according to claim 1, wherein the adjusting device comprises at least one adjusting element manually adjustable in the vertical direction.

6. Foundation system according to claim 1, wherein the adjusting device comprises at least one adjusting element having a vertically oriented threaded bolt, the vertically oriented threaded bolt having a vertical protuberance relative to the concrete body, and
   wherein the vertical protuberance can be adjusted by turning the vertically oriented threaded bolt.

7. Foundation system according to claim 6, wherein the adjusting device comprises at least one threaded sleeve or threaded plate cast into the concrete body, and
   wherein via the at least one threaded sleeve or threaded plate a screwing-in depth of the vertically oriented threaded bolt relative to the concrete body can be varied if necessary.

8. Foundation system according to claim 6, wherein a support head for the at least one metal carrier element is mounted at an end portion of the vertically oriented threaded bolt remote from the concrete body, and
   wherein the angle of the support head relative to the vertically oriented threaded bolt can be varied.

9. Foundation system according to claim 8, wherein the support head is mounted so as to articulate relative to the vertically oriented threaded bolt in the manner of a universal joint.

10. Foundation system according to claim 8, wherein the vertically oriented threaded bolt extends at least partially through the support head, the support head has a first support surface, and the first support surface is supported on the vertically oriented threaded bolt in a load-transmitting arrangement via at least one interconnected elastically flexible element, and wherein the support head is retained against the force of the at least one interconnected elastically flexible element so that an inclination of the support head relative to the vertically oriented threaded bolt can be varied.

11. Foundation system according to claim 8, wherein the support head is positioned via an interconnected bottom and top elastic element so that an angle of the support head relative to the longitudinal axis of the vertically oriented threaded bolt can be adjusted, and the vertically oriented threaded bolt extends through the support head with a radial clearance.

12. Foundation system according to claim 10, wherein the at least one interconnected elastically flexible element is provided in the form of at least one plate spring threaded over the vertically oriented threaded bolt.

13. Foundation system according to claim 1, wherein at least two mutually opposing end portions of the at least one metal carrier element respectively constitute facing portions, the vertical height of the facing portions being dimensioned so that an overlap remains by reference to the vertical direction even when the at least one adjusting device is extracted to the maximum position between the concrete body and the facing elements.

14. Foundation system according to claim 1, wherein the at least one base element supports a compartment system comprising several holding compartments or a controller housing of a safety-deposit machine or automatic vending machine made up of at least one compartment system and at least one controller housing.

15. Foundation system according to claim 1, further comprising several base elements, the several base elements being capable of being aligned in a row essentially without gaps and being of an identical structural design so that the number of base elements can be reduced and increased from one or both ends of the row.

16. Foundation system according to claim 1, wherein mutually opposing side walls of the concrete body extend in a slightly diverging arrangement by reference to external surfaces of the mutually opposing side walls from a base portion of the concrete body in the direction towards a top end portion of the concrete body as far as a first horizontal plane, and then extend in a slightly converging arrangement so that, by reference to a vertical section through the mutually opposing side walls, the external surfaces are respectively cambered or form at least two part-surfaces oriented at an obtuse angle to one another.

17. Foundation system according to claim 1, wherein the at least one metal carrier element has a plate-shaped, essentially flat base element for supporting a housing module of a self-service machine assembled on a modular basis.

18. Foundation system according to claim 17, wherein the plate-shaped, essentially flat base element has a central orifice, and wherein peripheral portions of the plate-shaped, essentially flat base element are designed to provide a load-bearing support for wall portions of a cabinet-type housing module.

19. Foundation system according to claim 1, wherein concrete bodies of respective base elements mutually aligned in a row are connected to one another to prevent the concrete bodies from drifting apart.

20. Foundation system according to claim 1, wherein the at least one base element comprises a first base element and a second base element, and wherein a housing module based on a cabinet-type design is supported in a load-transmitting arrangement on the first base element, the housing module being loosely aligned without a gap with an adjacently disposed cabinet-type housing module, the adjacently disposed cabinet-type housing module being supported on another base element, the housing module thus being able to move relative to the adjacently disposed cabinet-type housing module.

21. Foundation system according to claim 1, wherein the connection between the at least one base element and the at least one paving element is provided in the form of at least one cable or rod connection extending at least partially through the at least one paving element and the at least one base element.

22. Foundation system according to claim 21, wherein the at least one cable or rod connection can be lengthened or shortened via threaded portions if necessary.

23. Foundation system according to claim 1, further comprising mutually aligned paving elements and mutually aligned base elements, wherein end faces of the mutually aligned paving elements are remote from mutually aligned base elements and are secured via a plate connection to prevent the mutually aligned paving elements from drifting apart.

24. Foundation system according to claim 23, wherein the plate connection can be covered via at least one strip element of concrete and the at least one strip element is connected to the at least one paving element to prevent the at least one paving element from drifting.

25. Foundation system according to claim 1, wherein at least two mutually opposing wall portions of the at least one paving element have base portions and top faces and extend in a diverging arrangement from the base portions in the direction toward the top faces.

26. Foundation system according to claim 1, wherein the at least one base element in conjunction with the at least one paving element of concrete affords stability for a housing or housing module of a self-service machine, thereby obviating the need to anchor the at least one base element or the at least one paving element with respect to an underlying ground.

27. Foundation system according to claim 1, wherein at least one lamp unit is integrated in the at least one paving element, the at least one lamp unit illuminating the area around a self-service machine and/or illuminating the front face or interior of an opened holding compartment of a safety-deposit machine.

28. Foundation system according to claim 1, further comprising concrete bodies aligned in a row, wherein mutually adjacent side walls of the concrete bodies respectively have at least one wall portion able to be broken open and removed if necessary.

29. Foundation system according to claim 1, wherein the cavity of the at least one concrete body serves as a space for accommodating and running cable connections between mutually aligned housing modules and/or between at least one housing module and a controller housing.

30. Foundation system according to claim 1, wherein the at least one metal carrier element is screwed to a housing module of a self-service machine supported on the housing module so that the housing module cannot be detached.

31. Foundation system according to claim 1, wherein the at least one metal carrier element can be adjusted relative to a support head of at least one adjusting element of the at least one adjusting device via a connection which can be displaced laterally.

32. Foundation system according to claim 31, wherein the at least one metal carrier element is connected to the support head of the at least one adjusting element via at least one slot and via at least one screw connection co-operating with the at least one slot.

33. Foundation system according to claim 1, wherein a base portion or a base plate of the at least one housing module has at least one opening, and
    wherein the at least one adjusting device and/or a connection adjustable in translation can be accessed or operated from the interior of the housing module, even when the housing module has been secured to the at least one metal carrier element.

34. Foundation system for receiving the load of a housing or at least one housing module of a self-service machine, the foundation system comprising at least one base element, at least one paving element, and at least one adjusting device, the at least one base element having at least one support surface for a housing or for at least one housing module of a self-service machine,
    wherein the at least one base element comprises a concrete body and at least one metal carrier element supported thereon,
    wherein the at least one metal carrier element can be leveled relative to the concrete body via the at least one adjusting device,
    wherein the at least one paving element of concrete can be aligned along a front face and/or a rear face of the at least one base element in order to form a paved front area or approach area for a user of the self-service machine and the at least one paving element is connected to the concrete body so that the at least one paving element is prevented from drifting relative to the at least one base element, and
    wherein the concrete body has a top face, has a prismatic shape, and is at least partially surrounded by the at least one metal carrier element at least on two mutually opposing wall portions and at the top face.

35. Foundation system for receiving the load of a housing or at least one housing module of a self-service machine, the foundation system comprising at least one base element, at least one paving element, and at least one adjusting device, the at least one base element having at least one support surface for a housing or for at least one housing module of a self-service machine,
    wherein the at least one base element comprises a concrete body and at least one metal carrier element supported thereon,
    wherein the at least one metal carrier element can be leveled relative to the concrete body via the at least one adjusting device,
    wherein the at least one paving element of concrete can be aligned along a front face and/or a rear face of the at least one base element in order to form a paved front area or approach area for a user of the self-service machine and the at least one paving element is connected to the concrete body so that the at least one paving element is prevented from drifting relative to the at least one base element, and
    wherein the concrete body is prefabricated and a self-service machine is directly positioned via the concrete body at a respective installation site.

* * * * *